US006882299B1

(12) United States Patent
Allport

(10) Patent No.: US 6,882,299 B1
(45) Date of Patent: Apr. 19, 2005

(54) PORTABLE INTERNET-ENABLED CONTROLLER AND INFORMATION BROWSER FOR CONSUMER DEVICES

(75) Inventor: David E. Allport, Palo Alto, CA (US)

(73) Assignee: Research Investment Network, Inc., Irvine, CA (US)

( * ) Notice: Subject to any disclaimer, the term of this patent is extended or adjusted under 35 U.S.C. 154(b) by 0 days.

(21) Appl. No.: 09/483,577

(22) Filed: Jan. 14, 2000

Related U.S. Application Data

(63) Continuation of application No. 09/001,873, filed on Dec. 31, 1997.

(51) Int. Cl.[7] .............................................. G08C 19/12
(52) U.S. Cl. ........................ 341/176; 348/734; 359/142
(58) Field of Search .......................... 341/176; 345/156, 345/158, 173; 348/734; 359/142

(56) References Cited

U.S. PATENT DOCUMENTS

| | | | |
|---|---|---|---|
| 4,712,105 A | 12/1987 | Kohler | 340/825.69 |
| 4,718,112 A | * 1/1988 | Shinoda | 455/151.4 |
| 4,746,919 A | 5/1988 | Reitmeyer | 340/825.56 |
| 4,856,081 A | 8/1989 | Smith | 455/151 |
| 4,872,151 A | 10/1989 | Smith | 369/14 |
| 5,031,046 A | 7/1991 | Bruggeman | 358/194.1 |
| 5,075,771 A | 12/1991 | Hashimoto | 358/84 |
| 5,086,385 A | 2/1992 | Launey et al. | 364/188 |
| 5,093,718 A | 3/1992 | Hoarty et al. | 358/84 |
| 5,223,924 A | 6/1993 | Strubbe | 358/86 |
| 5,228,077 A | 7/1993 | Darbee | 379/102 |
| 5,251,034 A | 10/1993 | Na | 358/183 |
| 5,315,391 A | 5/1994 | Lee | 348/553 |
| 5,379,421 A | 1/1995 | Palazzi, III et al. | 395/600 |
| 5,410,326 A | 4/1995 | Goldstein | 348/134 |
| 5,422,677 A | 6/1995 | Do | 348/568 |
| 5,450,079 A | 9/1995 | Dunnaway | 341/23 |
| 5,455,570 A | 10/1995 | Cook et al. | 340/825.22 |
| 5,465,385 A | 11/1995 | Ohga et al. | 455/6.1 |
| 5,481,542 A | 1/1996 | Logston et al. | 370/94.2 |
| 5,500,691 A | 3/1996 | Martin et al. | 348/734 |
| 5,500,794 A | 3/1996 | Fujita et al. | 364/188 |
| 5,515,347 A | 5/1996 | Mulder et al. | 369/30 |
| 5,543,857 A | 8/1996 | Wehmeyer et al. | 348/589 |
| 5,545,857 A | 8/1996 | Lee et al. | 178/18 |
| 5,557,338 A | 9/1996 | Maze et al. | 348/565 |
| 5,561,708 A | 10/1996 | Remillard | 379/96 |
| 5,585,866 A | 12/1996 | Miller et al. | 348/731 |
| 5,589,892 A | 12/1996 | Knee et al. | 348/731 |
| 5,594,509 A | 1/1997 | Florin et al. | 348/731 |
| 5,600,368 A | 2/1997 | Mathews, III | 348/143 |
| 5,621,456 A | 4/1997 | Florin et al. | 348/7 |
| 5,629,733 A | 5/1997 | Youman et al. | 348/7 |
| 5,630,757 A | 5/1997 | Gagin et al. | 463/43 |
| 5,648,760 A | 7/1997 | Kumar | 340/825.25 |
| 5,648,824 A | 7/1997 | Dunn et al. | 348/734 |
| 5,657,072 A | 8/1997 | Aristides et al. | 348/13 |
| 5,689,663 A | 11/1997 | Williams | 395/327 |
| 5,692,214 A | * 11/1997 | Levine | 710/13 |

(Continued)

OTHER PUBLICATIONS

Scottsdale Technologies, Inc.'s Users' Manual to Program Master Product, © 1996, 1997.

(Continued)

*Primary Examiner*—Timothy Edwards
(74) *Attorney, Agent, or Firm*—Keiji Masaki; Steve A. Wong; Micah P. Goldsmith

(57) ABSTRACT

A remote control uses IR (infrared) commands to control various consumer appliances made by various manufactures. The remote control is low-cost, consumer-friendly, programmable, has its own graphical display so it does not interfere with a TV or other viewing screen, and is capable of interacting with the internet or other data source to provide a rich set of functionality.

46 Claims, 18 Drawing Sheets

U.S. PATENT DOCUMENTS

| | | | | |
|---|---|---|---|---|
| 5,710,605 A | * | 1/1998 | Nelson | 348/734 |
| 5,841,424 A | * | 11/1998 | Kikinis | 345/168 |
| 5,850,304 A | | 12/1998 | Elmers et al. | 348/734 |
| 5,886,732 A | | 3/1999 | Humpleman | |
| 5,889,506 A | * | 3/1999 | Lopresti et al. | 345/158 |
| 6,073,031 A | * | 6/2000 | Helstab et al. | 455/557 |
| 6,088,730 A | * | 7/2000 | Kato et al. | 709/227 |
| 6,163,316 A | * | 12/2000 | Killian | 345/721 |
| 6,286,142 B1 | | 9/2001 | Ehreth | |
| 6,340,987 B1 | | 1/2002 | Hayashi | |
| 6,484,011 B1 | * | 11/2002 | Thompson et al. | 455/3.06 |

OTHER PUBLICATIONS

Rotel of America's User's Manual to Rotel R990 Product (approximately Oct., 1997).

Page from product brochure of Marantz RC2000 Product (approximately Aug. 1996).

Lexicon, Inc.'s product brochure for Lexicon 500T Product, © 1994.

Niles Audio Corporation, Inc.'s product brochure for Intellicontrol product, Aug. 1996.

Full House Control Corporation, The RHOC, © 1997 (pages from website: www.fullhouse.com/rhoc.html), Apr. 29, 1998.

Full House Control Corporation, The RF Base Station, © 1997 (pages from website: www.fullhouse.com/base.html), Apr. 29, 1998.

Full House Control Corporation, RHOC for Windows, © 1997 (pages from website: www.fullhouse.com/rhocwin.html), Apr. 29, 1998.

KC–Z1 Stage 3 Home Theater Controller, Kenwood U.S.A. (pages from website: www.kewoodusa.com/cat...Stage_3_Components/KC–Z1.htm), Apr. 28, 1998.

Sony's Product Promotion Flyer for CDP–CX270 Product (approximately Jun., 1997).

Audio Advisor Magazine, Nov. 1997, p. 24.

Stereo Review Magazine, Sep. 1997, pp. 83–85.

Innovation Device Technologies, Inc. Executive Investment Summary (pages from website: www.innovativedevice.com/execsum.htm), Apr. 29, 1998.

Blue Mountain with Jblend, Aplix Corporation (pages from website: www.jBlend.com/products/bm.html), Apr. 29, 1998.

WebTV Backgrounder, WebTV Networks (pages from website: www.webtv.net/ns/about/backgrounder.html), May 4, 1998.

* cited by examiner

PORTABLE INTERNET-ENABLED CONTROLLER AND INFORMATION BROWSER FOR CONSUMER DEVICES

RELATED APPLICATIONS

This application is a continuation of co-pending U.S. application Ser. No. 09/001,873, filed Dec. 31, 1997, to which priority is hereby expressly claimed. This application contains subject matter related to co-pending U.S. patent application Ser. No. 09/001,841, entitled "System For Dual-display Interaction With Integrated Television And Internet Content," filed Dec. 31, 1997, invented by the same inventor as the present invention, and assigned to the same assignee as the present invention. The entire original disclosures of the above-referenced co-pending applications are hereby expressly incorporated herein by reference.

FIELD OF THE INVENTION

The present invention relates generally to remote controls for controlling consumer devices, and more particularly to remote controls for controlling a variety of consumer devices from various manufacturers, and which are capable of using data downloaded from the internet or other data sources to do so.

BACKGROUND OF THE INVENTION

Consumers use remote controls for controlling a variety of devices such as TVs (televisions), radios, VCRs (video cassette recorders), and other home appliances. Typically, the remote controls use IR (infrared) communications to send signals to the devices to be controlled. IR communications operate effectively only within a limited range, but nonetheless IR remote controls provide a great benefit for consumers because they allow consumers to control the desired devices from a couch, a chair, a bed, a desk, or some other relaxing remote location without having to manually adjust the controls on the device being controlled.

A particular manufacturer will establish a proprietary IR protocol (i.e., sequence of IR commands that a device will recognize) for a particular device or series of devices, and will typically provide a proprietary remote control with the necessary IR commands already loaded into its memory to allow the consumer to control the device or devices. Protocols from one manufacturer may and usually do differ from protocols of other manufacturers for similar devices.

Many types of remote controls exist, each with their own features, and each with their own limitations. For example, the most basic remote controls are dedicated to a single device made by a single manufacturer. These remote controls usually are fairly simple to operate, and are not programmable. For the same reason, however, they have limited functionality. Furthermore, once a consumer attains many devices from various manufacturers as is extremely common, managing the multitude of various remote controls for the various devices becomes very burdensome both physically and mentally.

One attempt to solve the problems associated with remote controls dedicated to a single device led to what is commonly known as "universal" remote controls. With universal remote controls, the IR protocols for various devices are typically pre-loaded into the remote control's memory. Even so, the consumer might have to use a trial-and-error basis to determine which protocol to use for a particular device. And it is possible that the proper protocol for the device to be controlled was not pre-loaded by the manufacturer of the remote control, because the device was too old, too new, or simply not popular enough as determined by the manufacturer of the remote control. In any of those cases, the consumer would typically be required to have the protocol loaded by a professional at a service location, or may even be required to send the remote control to the manufacturer of the remote control, and even then it may be difficult for the third party to correctly ascertain and load the proper protocol.

Some universal remotes are "programmable" to allow specific IR command sequences to be associated with specific physical buttons, but the remote control does not help the consumer associate the physical buttons with the actual function performed by the buttons, and the consumer is thus forced to memorize the function each button is programmed for each time the remote control is reprogrammed. Custom-made labels could be used to associate the buttons with their functions, but that creates an additional problem of tying a button to a single function, thus limiting the remote control's functionality. Creating more buttons could solve that problem, but in turn would result in a consumer-unfriendly device due to its complexity.

Another type of universal remote control has the additional feature of allowing the consumer to load the IR protocols into the universal remote's memory by modem line or PC (personal computer).

The "Program Master" by Scottsdale Technologies is of this type. The "Program Master" may be "programmed" by the consumer using companion PC software to select the desired information (e.g., TV programs to be taped) and then initiating the downloading of the information into the "Program Master" by pressing a button (the only button) on the "Program Master." The internal clock of the "Program Master" causes the remote control to send appropriate IR command sequences to the consumer's VCR, TV, and cable receiver at the desired times. But once the "Program Master" is programmed, there is no way to modify the settings except by re-programming it using the companion PC software.

Other universal remotes, such as the Marantz RC2000, have a display so the buttons could be programmed to allow greater functionality, and each button may correspond to several different functions depending on the "mode" setting of the remote. A description of each function associated with each programmed button for a given mode may appear on the display next to the button, but display space is typically limited. The Marantz RC2000, for example, has space for only five characters per button. Another remote control, the Lexicon 500T, overcomes this problem to some extent, because it has the additional feature of a touch screen and graphical display 256 pixels by 128 pixels so the consumer may control the size and layout of the graphical buttons to some degree. However, the Lexicon 500T retails for several thousand dollars, and is very limited in its use of internet data. For example, though the Lexicon 500T is capable of accessing IR protocols from the internet and downloading them into its memory, with companion PC software mapping the specified IR command sequences to the specified areas on the display screen, it cannot, like the "Program Master" described previously, make automated use of internet data such as desired TV programs to be taped.

Some remote controls obtain more functionality and more power by communicating with the controlled devices through a proprietary base station. The base station is generally located at the site of the devices to be controlled, and the base station, not the remote controls, actually control the devices. The remote controls communicate solely with the base stations. The base stations in turn interact with the devices to be controlled through a variety of protocols such as X10 (power line communications), CEBus (common for communication over a home local area network), and RS232 (IEEE serial communication via a communication port in a PC). Examples of these types of remotes are the "RHOC" by Full House Control Corp., and the "IntelliControl" home automation system by Niles Audio Corp. These systems are fairly powerful, in that once the base stations are programmed, they can typically recognize a variety of industry standard protocols, so consumers could use the remotes to operate various devices made by various manufacturers. However, the base stations are costly, and installation and programming of the base stations are fairly complex and usually require a trained professional. Furthermore, the remote controls are limited in their ability to provide information back to the consumer, due to limited or total lack of display. The "RHOC," for example, though equipped with some programmable physical buttons, has a limited display of 128×64 pixels. The Intellicontrol, available in both a hand-held and table-top version, has no display at all, though the base stations associated therewith may have a two-character LCD (Liquid Crystal Display) and/or several LEDs (light-emitting diodes).

Another common type of remote control is that which is linked to a primary display such as a TV display. Remote controls used to operate Web TV fit into this category. Though they allow a consumer to exercise parental control, monitor E-mail, place internet bookmarks, view web content related to real time TV events, and perform other web-related tasks, they affect the TV viewing screen in the process, thus limiting use of the screen for viewing regular TV-based content. Another example is Sony's S-Link control bus system which allows use of the TV display in conjunction with the automated control of home appliances, such as Sony CD players and Sony TVs. All of these systems, however, affect the TV viewing screen because control information is displayed on the screen, thus impacting the overall view of the display. And some of the systems (e.g., Sony's S-link control bus system) are further limited because they are compatible only with proprietary devices.

It is also possible to use the IR communications capability of palm-top PCs to control consumer appliances. However, palm-top PCs are relatively costly for this type of application, since they are manufactured and intended to be used as general purpose computers. For that reason, they also require knowledge and use of PC operating system software such as MS-DOS, Windows, or other operating systems. Moreover, because the hardware is designed primarily for computer data transfer, the physical range of IR commands from palm-tops is limited, and the reliability of the execution of the commands themselves also drops as the distance between the remote control and the device being controlled increases.

Thus, though there are many variations of remote controls available for controlling consumer devices, each has some drawbacks. It would be desirable to automate control of various consumer appliances made by various manufactures, using a single, low-cost, consumer-friendly, programmable remote control that does not interfere with the primary viewing screen, and that is capable of interacting with the internet or other data sources to provide a rich set of functionality.

SUMMARY OF THE INVENTION

As used in this application, "consumer" refers generally to any person that may use the remote control described herein, whereas "user" is used to distinguish one particular consumer from other consumers generally. The use of "consumer" versus "user" is not intended to have any substantive effect on this application, but is made solely to simplify understanding of certain parts of the application, as will become apparent.

Also as used in this application, the verb "to play" is used generally to describe the result of a device producing its intended output. For example, a broadcast TV program is "played" on the TV; a song is played on the radio; a video cassette is played by a VCR, a music CD is played by a CD player; etc.

Also as used in this application, the term "program" (when used as a noun) and the term "title" are sometimes used interchangeably to refer to the name of a particular event being played, to be played, or having been played. For example, a program or title may be a broadcast TV event; a song title or album title from a CD; an event recorded on a video cassette; etc. There may also be titles within titles, as in the case where an album title further contains individual song or track titles.

Also as used in this application, the term "IR command sequence" is sometimes used interchangeably with the terms "IR command" or "IR commands." An IR command sequence is simply a predefined series of IR commands which may include only one IR command, or multiple IR commands to a single device, or IR commands to more than one device.

The present invention relates to a remote control dedicated to the control of various consumer devices made by various manufacturers, and to methods of its use. It has programmable function keys (both physical and on-screen), and a graphical display used to show status and help information on the devices being controlled, identify the function associated with each key, and allow the consumer to browse, select, or otherwise manipulate data related to the control of the consumer devices. The remote control communicates directly with the devices being controlled, or through other proprietary base stations with known protocols (e.g., X10 or CEBus) if necessary.

The remote control of the present invention is relatively inexpensive, as compared to the cost of palm-top computers, or other remote control systems that require base stations, etc. The cost of implementing the remote control of the present invention is also not affected by the potential legacy nature of the devices being controlled, because the controlled devices do not require special hardware or software. All the remote control needs in order to control a device is the IR command sequences that the device responds to so that the commands may be loaded into the memory of the remote control for later execution. The information is generally available from the manufacturer of the device, or from the internet, or from any of several other sources.

The remote control of the present invention is also consumer-friendly in its appearance and ease of use. There are a manageable number of physical buttons, for example approximately eight to twelve. The drawings show a preferred embodiment having nine physical buttons. More important, however, is that the actual functions performed by the buttons are visibly associated with the buttons themselves, so the consumer does not have to memorize such associations or rely on mnemonics printed on labels or limited displays. Another consumer-friendly aspect of the present invention is that it allows the consumer to access desired CDs, TV programs, satellite or cable programs, video cassettes, web sites, etc. through consumer-friendly associations (such as program name, song title, album title, consumer-defined sequence name, video cassette title, etc.) instead of through channel, track number, device name, or other non-consumer-friendly associations.

The term used in this application to describe this aspect of the consumer-friendly nature of the invention is "title-based direct access control." It is title-based because the type of entertainment requested is based on the title of the media program. It is direct access because from the consumer's point of view, access to the media program follows directly from the consumer's title-based request. The underlying associations (of specific IR commands to specific devices) that must be determined to satisfy the consumer's request is controlled by the remote control. Similarly, the term used in this application to describe the consumer-friendly nature of the actual descriptions displayed (such as program name, song title, album title, consumer-defined sequence name, etc.) for browsing, editing, selecting, etc., is "title-based descriptions." This is to be distinguished from information that is not title-based, such as a slot number in a CD tower, or a channel on a TV, or a track number on a CD, etc. Having to use information that is not title-based to access a desired program is not as intuitive as using title-based descriptions to access the program.

On-display help also simplifies the initial device configuration, and status and other feedback information is available on-display during actual operation. All of the above features, and others as will be described herein, are designed to allow the consumer to use the remote control of the present invention in an efficient, powerful, and easy manner to control a broad range of devices from the comfort of a location remote to the actual devices being controlled, yet close enough to enjoy the entertainment or other services they provide.

In addition to having some physical buttons with fixed functions, the remote control of the present invention may be programmed such that some fixed buttons and certain areas of the display that represent command buttons or "soft keys" may be defined by the consumer to control specified functions on specified devices. Passwords and filters may be programmed into the remote control either by integrated software, downloaded applets, or companion PC software, to limit or deny access to certain information. This may be useful, for example, to assist parents in controlling what programs or channels their children may access.

Another important feature is that the integrated display allows the consumer to view associated information without interfering with the viewing screen of the primary display such as the TV. This is an improvement over many of the remote controls previously described herein.

One of the most powerful aspects of the remote control of the present invention is its ability to interact with and gather data from the internet or other data sources such as a PC, and make use of a wide variety of data thus obtained. Specifically, the remote control is capable not only of downloading device configuration information (i.e., IR command libraries) from the internet as existing universal remotes are, but is capable also of receiving other internet data that can be used in interacting with the controlled devices. For example, title-based descriptions such as TV schedules can be downloaded into the memory of the remote control, and then listed and browsed on the display of the remote control, while the corresponding information needed to associate the consumer-friendly title-based descriptions (e.g., program name) with the proper IR command sequences is downloaded therewith in a manner that does not need to concern the consumer. The corresponding information is sufficiently related to the title-based descriptions such that the remote control (preferably through the use of integrated software) is able to determine a proper IR command sequence to send to the device or devices being controlled in order to effect the playing of the program or programs selected by the consumer. The corresponding information may include, for example, the broadcast time, channel, and duration of each broadcast TV program for which the title-based descriptions (i.e., program name) was downloaded. All the consumer cares about is that the consumer may thereafter simply select the desired program from the list being browsed on the display of the remote control, by touching the corresponding function key, button, or other area of the display.

Another example is that CD track data can be downloaded from the currently available CDDB internet database (http://www.cddb.com), preventing the need for a consumer to manually enter the data. The consumer-friendly descriptions (such as title, song, etc.) may then be viewed on the display of the remote control and selected by the consumer without regard to the physical location of a CD in a CD tower, or the physical location of a particular song on a particular CD.

Accordingly, it is an object of the present invention to provide an improved remote control for controlling a variety of consumer devices made by a variety of manufacturers.

It is a further object to provide a remote control that allows a consumer to download data from the internet or other data source into the memory of the remote control for use in controlling the consumer devices using title-based direct access control.

It is a further object to provide a remote control with a graphical display that allows a consumer to achieve the above-mentioned objects without interfering with the display screen of any of the devices being controlled or of any other devices other than the remote control itself.

It is a further object to provide a remote control with a graphical display, the remote control being programmable so that predetermined areas of the display may be defined by the consumer to control specified functions on specified devices.

It is a further object to provide improved methods of using a remote control to control a variety of consumer devices from a variety of manufacturers.

Other objects and advantages of the present invention will become apparent from the detailed description of preferred embodiments which follow, when read in conjunction with the drawings.

DETAILED DESCRIPTION

The remote control of the present invention, and methods of its use, will first be described in terms of its functionality and associated software, and the hardware components will be described thereafter.

The actual software may be written in any convenient programming language or languages, and preferably comprises an underlying system control component and an application interface component. The system component controls the execution of the actual commands necessary to control consumer devices. It controls the storage, access, and other data management tasks necessary for proper functioning. Preferably, a relational database of entries is maintained, each entry describing multiple features of a particular title or program, such as the time of day of its showing, which source device it is derived from (TV, satellite, etc.), which artists are featured, and what category it belongs to (comedy, drama, sports, etc.). Some of the fields are not applicable to all types of entries. For example, each track on a CD would be one entry, and although a duration is associated therewith, there is no start or end time because it is assumed to be available from a multiple-disc CD player at any time desired. Much of the database information is derived from the internet, but additional information may come from other data sources, or even be entered by the consumer as described herein. The system component also retains an internal representation of each device being is controlled, its type (CD player, TV, etc.), name, and associated icon if applicable. The system component also maintains a table of IR commands for each device, along with associated data such as the representation of the commands on the remote control's display.

Figure 1:
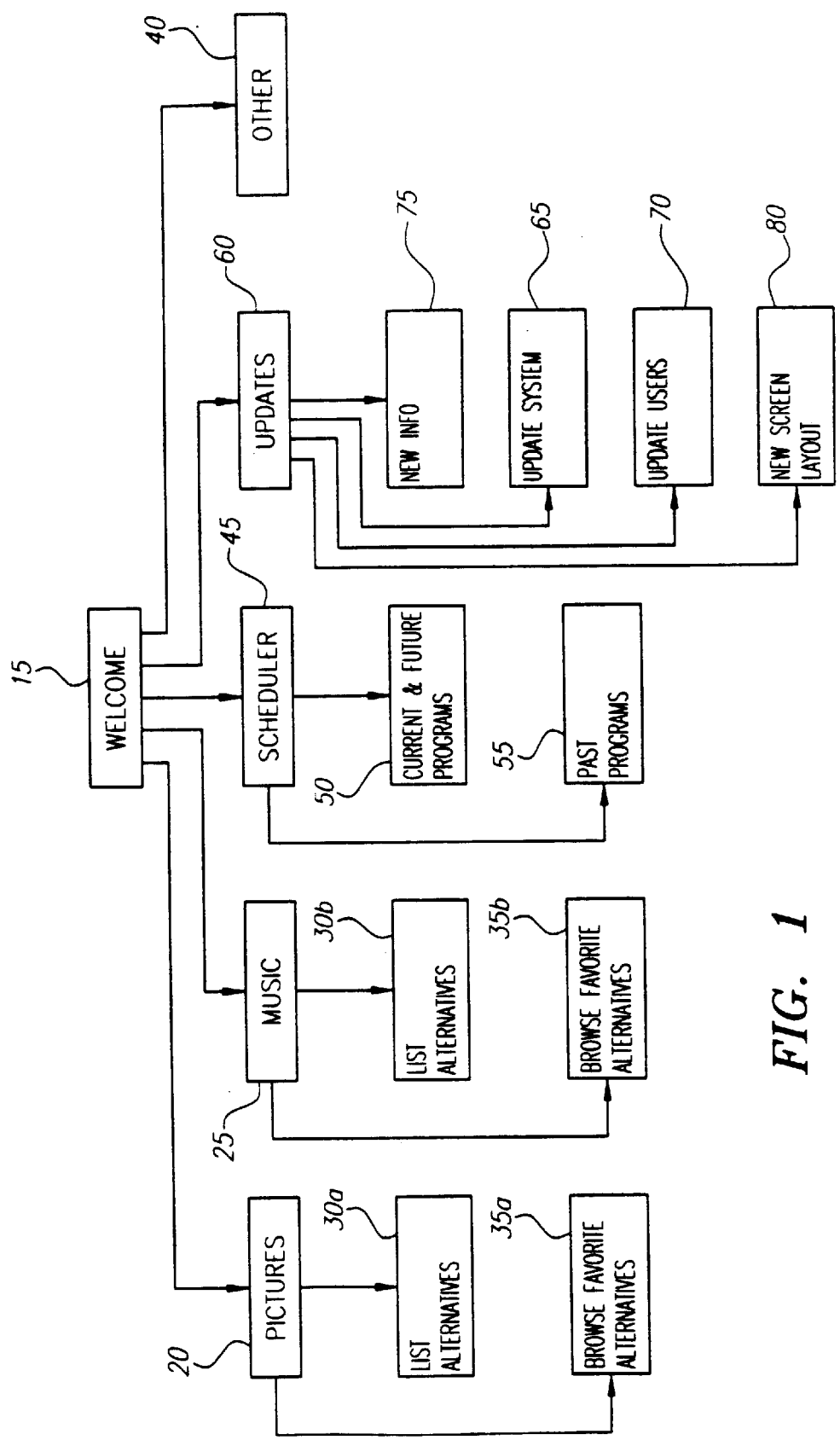
FIG. 1 is a diagram showing the hierarchical relationship between some of the available screens in a preferred embodiment of the remote control of the present invention.

The application interface component (also controlled by the system component) acts as a front-end for the consumer to program and otherwise make use of the system component, without ever having to understand the details of the system component. It is designed to be consumer-friendly, as described herein, and in a preferred embodiment is implemented such that a control algorithm allows the consumer to navigate through the available screens to accomplish the desired title-based direct access control over consumer devices. The hierarchical relationships among some of the available screens in a preferred embodiment of the remote control is shown in FIG. 1. These high-level relationships will be described first, and the details of the individual screens will follow thereafter. However, to better understand the benefits and operation of the remote control, it will be helpful to keep this high-level relationship in mind even as the individual screens are described in detail thereafter.

The remote control may be programmed using an integrated graphical keyboard for simple tasks such as entering and modifying passwords, or for more complex programming, but the latter is preferably done with the use of companion software using an IR keyboard in conjunction with the remote control's display or another display, or using PC software on a PC. For example, the functions to be performed by certain buttons may be programmed by companion software using an IR keyboard in conjunction with the remote control's display or another display, or using PC software on a PC, and the display would then show the association of physical or touch screen actuating buttons with the actual functions they perform, as will be described herein. Passwords and filters may be programmed to assist parental control or other monitoring, and screen layouts may also be designed. These concepts will be described herein in more detail. Java applets or similar predefined functions may also provide a source of filters or other information and may be downloaded from the internet or other data source. Examples include: recommended viewing or listening lists from well-known organizations or other critics; IR command libraries; local TV schedules; and CD track data. The remote control supports standard interface protocols (e.g., Java's Abstract Window Toolkit, Netscape's Internet Foundation Classes, etc.), and therefore the consumer may simply select desired lists using simple third-party software, and then download the lists and their associated information to the remote control's memory.

The software is preferably programmable by the consumer and presents a unified system view of various devices being controlled. For example, there may be volume and channel controls on one screen which control the volume of a stereo speaker connected to a TV output and the channel on a cable box connected to the TV input respectively. The ease of this system contrasts with that of known universal remote controls where it is necessary to first select a "stereo" mode, then change volume, then select "cable" mode to change channel.

For the following descriptions, it is presumed that the memory of the remote control already has the information necessary to allow the remote control to perform the functions described. The actual methods of loading the information into the memory will be described subsequently.

Figure 3:
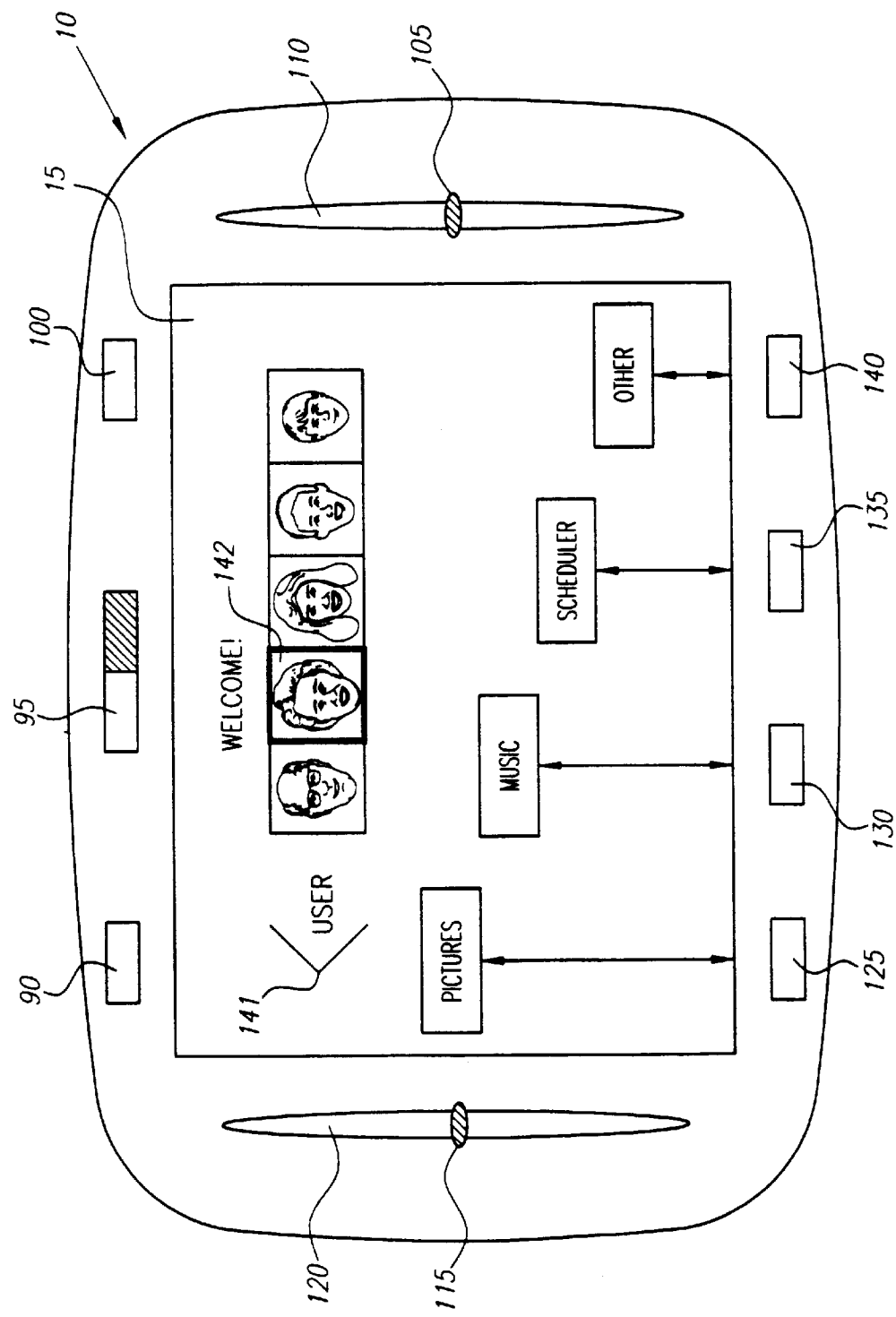
FIG. 3 shows the remote control of FIG. 2 displaying a preferred embodiment of the "Welcome" screen of FIG. 1.

Turning now to FIG. 1, the "welcome" screen 15 (described in more detail in conjunction with the description of FIG. 3) will appear on the display of the remote control 10 when the remote control 10 is first turned on, and after the proper password or other "log-on" means (such as use of a "smart card") has been entered in response to an appropriate query if a password or other log-on means are required. This screen provides the consumer with a variety of first-level options to choose from. For example, the consumer may choose to be entertained by pictures, in which case the consumer would select the "pictures" screen 20 by depressing the appropriate physical button or display area as will be described shortly. If the consumer wished to be entertained by music, the consumer would select the "music" screen 25 in a similar manner.

The physical source of the entertainment (e.g., a video, DVD, satellite, TV broadcast, VCR, etc. for pictures, or a phonograph, tape player, CD player, radio, DVD, etc. for music) would not be of concern to the consumer. The consumer would simply request the entertainment type, and the remote control 10 would send the appropriate IR commands to whatever devices needed to be controlled to satisfy the consumer's request. This consumer-friendly concept of presenting information to the consumer in a manner related to how the consumer thinks (i.e., in terms of type of entertainment) as opposed to physical devices (such as a TV, cable box, tape player, etc.) is consistent with the title-based direct access control that is an important aspect of the invention. Once the type of entertainment is selected, title-based direct access control as previously described allows the consumer to select specific entertainment based on song title, program name, etc., and not based on such non-intuitive factors as channel, track, CD slot, etc. The remote control 10 hides the complexity of the associations formed by the consumer's request to the actual IR commands that must be executed to satisfy the request. The consumer controls what he or she sees or hears; the remote control 10 controls the devices necessary to make it so.

Both the "pictures" screen 20 and the "music" screen 25 present the consumer with the option of selecting lower-level "list alternatives" screens 30a and 30b respectively or "browse favorite alternatives" screens 35a and 35b respectively. The "list alternatives" screens 30a and 30b provides the consumer with the available TV programs, CD titles or songs, radio broadcasts, DVD titles, or whatever other type of entertainment is available depending on which higher level screen the "list alternatives" screen depends from. On the "list alternatives" screens 30a and 30b, the consumer could tag desired entries for later browsing through the "browse favorite alternatives" screens 35a and 35b, or could un-tag them so that they would no longer appear on the "browse favorite alternatives" screens 35a and 35b.

To control devices that are not primarily for entertainment and would therefore not be accessible from the "pictures" screen 20 or from the "music" screen 25, the "other" screen 40 is selected, which would in turn present the consumer with a list of further available options appropriate to the specific devices. Devices controlled from the "other" screen 40 may include kitchen appliances, a web browser on an advanced TV, a security system, a baby monitor, etc. Though these devices typically do not have title-based descriptions associated with them to the same degree as the picture- and music-producing devices do, nonetheless these devices may be accessed through icons or other consumer-friendly associations. Also, as is true even when picture- or music-producing devices are operating under the control of the remote control 10, IR commands may be sent to one device to effect a change to video output without affecting the audio output of another device. For example, while listening to music from a CD player, a request to view the security camera pictures on the TV will change the video output on the TV, but the music will continue to play uninterrupted. Similarly, IR commands may be sent to one device to effect a change to audio output without affecting the video output of another device. For example, while watching TV with a baby sleeping in a dark room elsewhere in the house, a request to hear the audio from the baby monitor will change the audio output, but the video output from the TV will be unaffected.

Also preferably available from the "welcome" screen 15 is an option to access a scheduling feature of the remote, by selecting the "scheduler" screen 45. The "scheduler" screen 45 allows the consumer to monitor and control the current status of the devices, the future tasks scheduled to be performed by the devices, and the prior history of the tasks performed by the devices under the control of the remote control 10. This is done through the "current & future programs" screen 50 and the "past programs" screen 55.

The "updates" screen 60 available from the "welcome" screen 15 allows the consumer to identify new devices to the remote control 10 and load the required IR commands for the new devices into the memory of the remote by accessing the "update system" screen 65. It also allows the consumer to identify new users of the remote control 10 (e.g., various members of the family) using the "update users" screen 70; load new title-based descriptions (e.g., TV schedules, CD song titles, etc.) into the memory of the remote control 10 using the "new info" screen 75; and modify or create screen layouts to appear on the display of the remote control 10 using the "new screen layout" screen 80.

Additional relationships may exist, and additional screens may exist, though they are not shown in FIG. 1. For example, the consumer will preferably be able to navigate from a particular screen back to its parent screen, or from a first-level screen to any of the lower-level screens depending therefrom, or from a first-level screen to another first-level screen. The exact navigational algorithm used is not important, but what is important is that the information and options are presented in a consumer-friendly manner. The above-described relationships represent only one possible organization of the screens.

Figure 2:
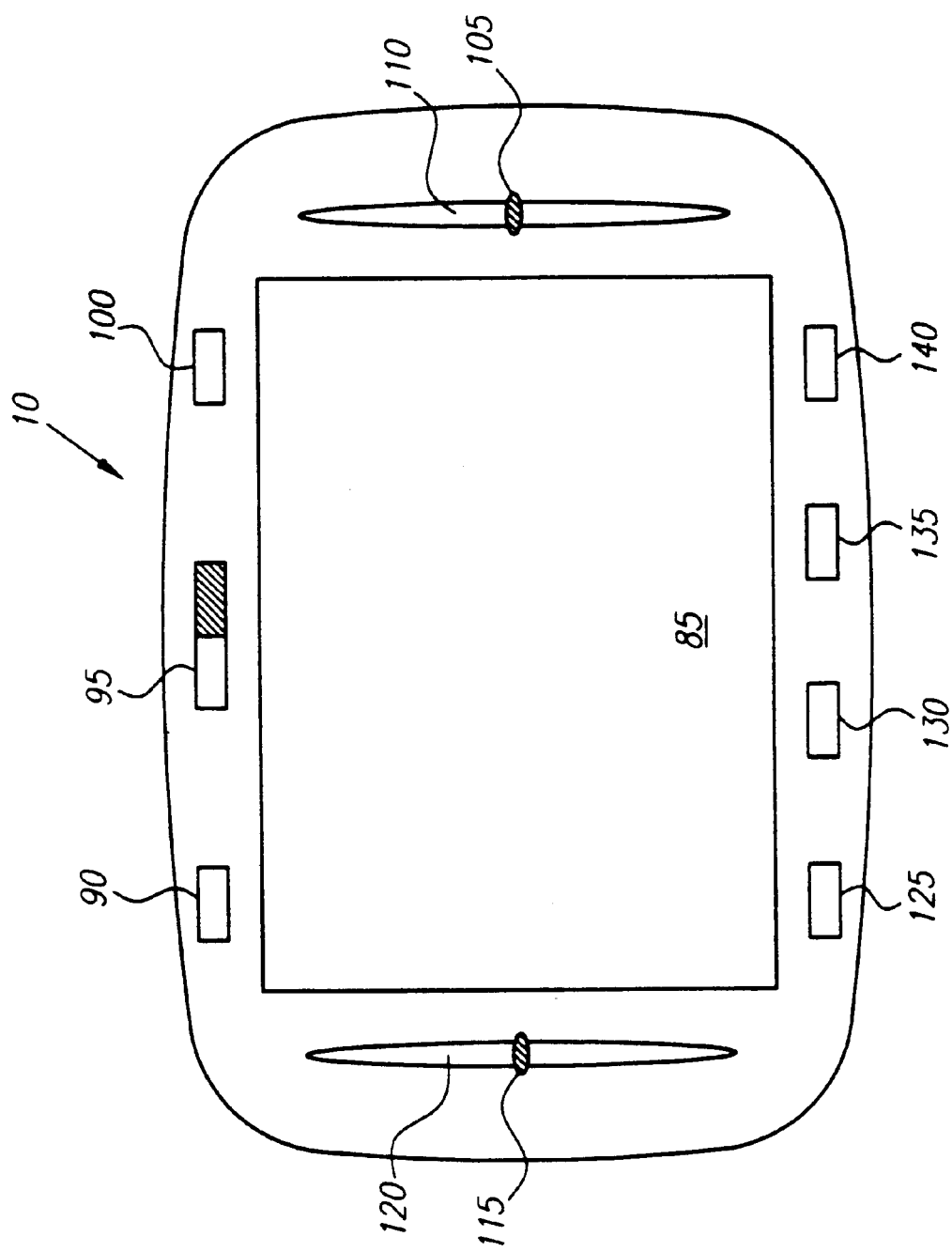
FIG. 2 shows a preferred embodiment of the remote control with a variety of physical actuating buttons, and a blank display.

Before describing individual screens, it will be helpful to provide a brief description of the display area 85 and buttons surrounding the display area 85 as seen in FIG. 2. The physical display area 85 that allows the screens to be presented to the consumer is part of the remote control 10 itself. The display is preferably an LCD and is 320 pixels by 240 pixels (¼ VGA). It may have better resolution (i.e., greater than 320 pixels and/or greater than 240 pixels) or lesser resolution, but preferably not lesser. It may be monochrome or color, and is preferably touch sensitive. As for physical size, the drawing is not to scale, but preferably the remote control 10 is a hand-held size on the order of only several inches long by several inches wide by a few inches deep, such that it may be carried comfortably in one hand or in a shirt pocket. Various physical actuating buttons, such as sliders, push buttons, switches, touch-sensitive pads, levers, toggles, dials, knobs, pull buttons, a mouse, etc., are present on the remote control 10. The various physical actuating means surround the display 85 as seen in FIG. 2. There may be, for example, up to twenty physical buttons, or less than twenty, and more preferably less than fifteen, and more preferably less than twelve, and still more preferably ten or less.

For example, there is an on/off toggle switch 90 connected to a power source by a battery terminal or an AC circuit (not shown). There is also an updates button 95 (shown as a slider) that is used to prevent the accidental addition, deletion, or modification of the remote control's 10 settings. If the updates button 95 is in the disable position, the "updates" screen 60 will be inaccessible, or at least be unusable to effect any changes to the remote control's 10 settings. Other screens may also vary depending on the position of switch 95, and there may also be software to provide this type of security.

A "help" button 100 allows the consumer to access information about the particular screen being viewed, or about a particular button as applied to the screen being viewed. If the button 100 is pressed and released, help information related to the screen appears. This information includes the name of the screen, the overall purpose of the screen, its relationship to other screens, how to access the screen, and other helpful information. Pressing and releasing the button 100 again returns the consumer to the screen being viewed prior to pressing the help button 100. If the button 100 is pressed, and while being held down a second button (either physical or on-display) is pressed or otherwise selected, help information appears for the second button. This information includes the specific function of the button as applied to the screen being viewed. To view help for another button, the consumer simply presses the new button instead of the second button, while still holding down the help button 100. Discontinuing to press down a the help button 100 and the button for which help is being sought, sends the consumer back into the general help mode, from where the consumer may simply press and release the help button 100 as described to return to the original screen being viewed prior to transferring into help mode. Thus, when not in help mode, pressing button 100 and either releasing it or concurrently selecting another button transfers the consumer into help mode. When in help mode, pressing and releasing the button 100 exits the consumer out of help mode and returns back to the operative screen. If the help information to be displayed could not fit onto the display 85, the consumer could view the remainder of the information by actuating a specified button or touch screen area to scroll the information. Buttons 90, 95, and 100 are not programmable and are dedicated to the specific functions described herein. The other buttons, however, may be used for various functions depending on the active screen and the position of button 95.

A slider button 105 with a spring mechanism biased to the center of a slot 110 may exist for controlling functions such as up and down channel. A similar slider button 115 without a spring mechanism is moveable within another slot 120 and may be used for controlling volume or other functions whose full range may be represented by the limited physical distance available within the slot 120. Button 125 is used as a mute toggle in conjunction with some screens, and for other functions in connection with other screens as described herein. Other buttons may exist for controlling other attributes of the remote control 10 or of the devices being controlled. For example, button 130 is commonly, though not always, used as a "parent screen" button that allows the consumer to return to the screen that is logically the parent of the screen being viewed, as could be determined from FIG. 1. In the context of the "pictures" screen 20 as described in conjunction with FIG. 1, pressing the "parent screen" button 130 from the "list alternatives" screen 30a would return the consumer to the "pictures" screen 20 as seen in FIG. 1.

Some physical buttons (e.g., buttons 135 and 140) may be programmable and may control functions such as navigation between screens, navigation within a screen, sending IR commands, altering the contents of memory within the remote control 10, or any other function that may be applicable. Certain areas of the graphical display 85 will indicate the function of a particular programmable physical key at any given time. The graphical display 85 will also have some programmable buttons, known as "soft keys," as will be described in conjunction with particular screens shortly.

Turning now to individual screens, FIG. 3 shows a typical "welcome" screen. The different users of the remote control 10 may be identified by text, graphical icons, or other images including scanned photos, as shown in area 141. The current user may be indicated by highlighting as seen in area 142, or by clearing the display of all other users, or in any other manner. Access to the various functions is obtained from buttons 125, 130, 135, and 140, or by soft keys (not shown) if there are more functions available than there are physical buttons. For example, buttons 125, 130, 135, and 140 are shown to transfer the consumer to the "pictures" screen 20, the "music" screen 25, the "scheduler" screen 45, and the "other" screen 40 respectively, which are four of the high-level screens available as seen in FIG. 1. If button 95 is in updates-enabled mode, an area on the display 85 would exist to allow the consumer to transfer to the "updates" screen 60.

Figure 4:
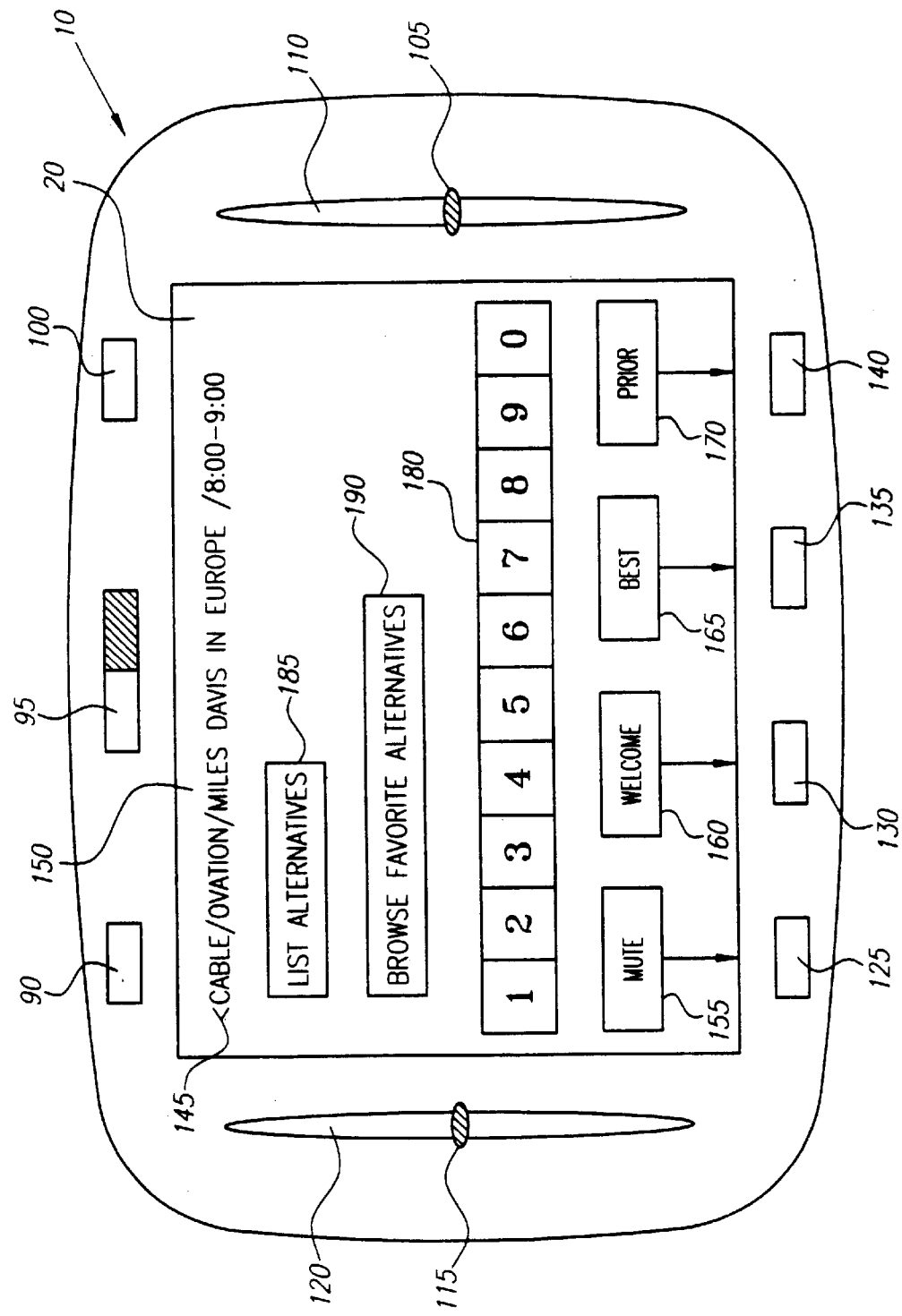
FIG. 4 shows the remote control of FIG. 2 displaying a preferred embodiment of the "Pictures" screen of FIG. 1.

A typical "pictures" screen 20 of FIG. 1 is shown in FIG. 4. Various areas on the display 85 are defined by the system component of the integrated software, and each area is used to display specified information to the consumer. The exact layout may be designed by the consumer using integrated or independent software, or the layout may be chosen from a set of templates provided to the consumer through the integrated software, or the layout may be fixed at the time of manufacture. The layouts shown in this application are illustrative only of one possible format, and it is to be understood that many different layouts may be used without departing from the concepts of the present invention.

Turning to the examples shown in FIG. 4, a first area 145 is used to display a description 150 of the current program being watched on the primary display such as the TV. The information may include the source of the picture entertainment (e.g., cable, VCR, satellite TV, etc.), the station or channel (e.g., Ovation, HBO, channel 2, etc.), the name of the program (e.g., Miles Davis in Europe), and the start and end time of the picture entertainment. Other areas 155, 160, 165, and 170, are used to indicate the current function of corresponding physical buttons 125, 130, 135, and 140 respectively, which functions may vary according to the specific screen presented to the consumer. On the "pictures" screen 20, area 155 shows that button 125 is used as a mute/un-mute toggle button. Area 160 indicates that button 130 returns the consumer to the "welcome" screen 15, which as seen in FIG. 1 would be the parent screen. Areas 165 and 170 indicate the functions of the programmable buttons 135 and 140 as "best" and "prior" respectively. Pressing button 135 from the "pictures" screen 20 will thus command the device or devices needed in order to display the "best" program on the primary viewing screen (e.g, the TV screen). The "best" program for the current time period would have been previously tagged from the "list alternatives" screen 30*a* or "browse favorite alternatives" screen 35*a*. Pressing button 140 from the "pictures" screen 20 will command the current device being controlled to switch to the program the device was showing "prior" to the remote control 10 commanding the device to switch to the program then being shown.

The slider button 105 is used to change channels, or instead of using slider 105, the consumer may enter the desired channel directly via a numeric keypad displayed in area 180. Slider 115 is used to control volume, if applicable.

Figure 5:
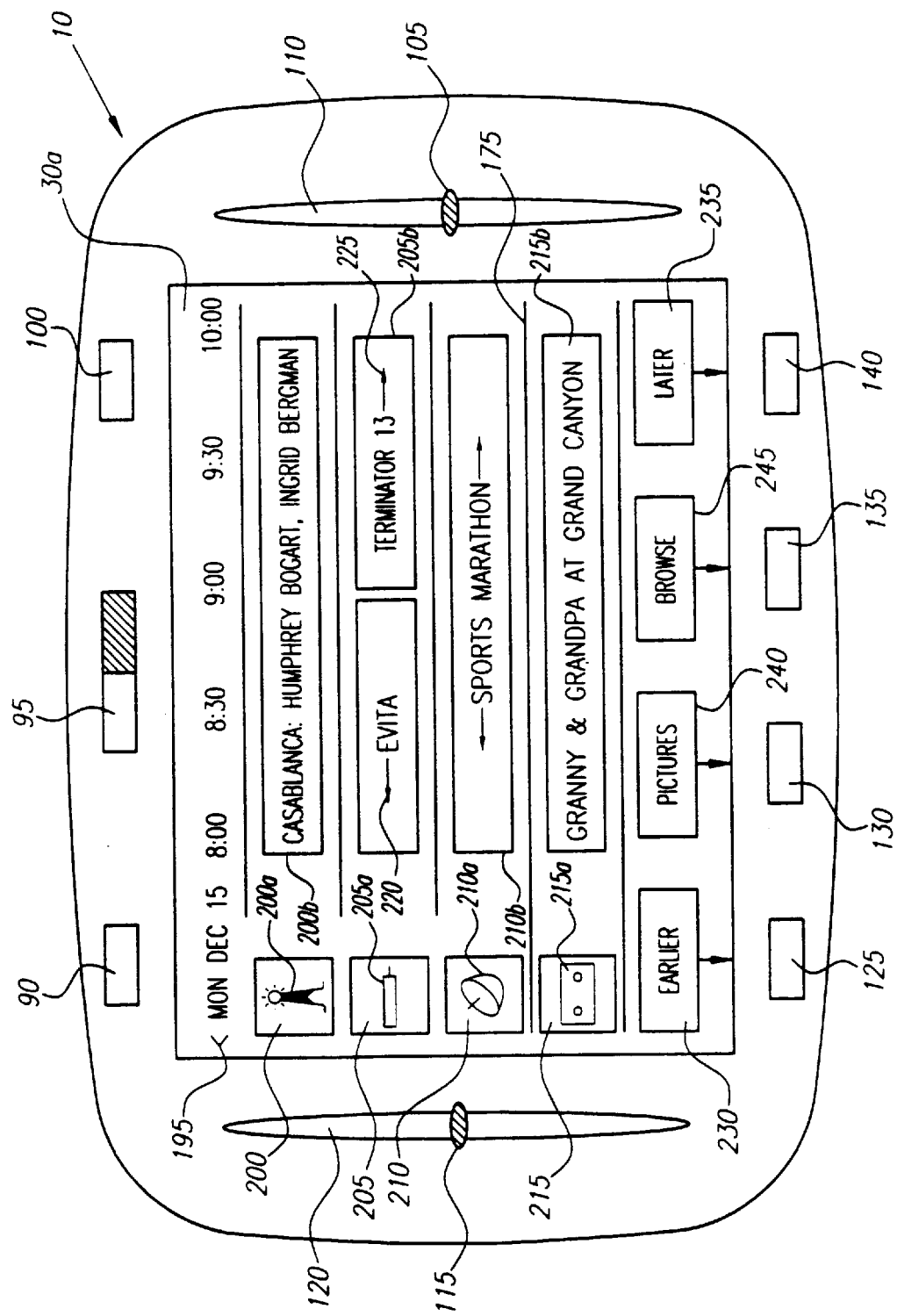
FIG. 5 shows the remote control of FIG. 2 displaying a preferred embodiment of the "List Alternatives" screen of FIG. 1 that is used in conjunction with the "Pictures" screen of FIG. 1 when the remote control is in an updates-disabled mode.
Figure 6:
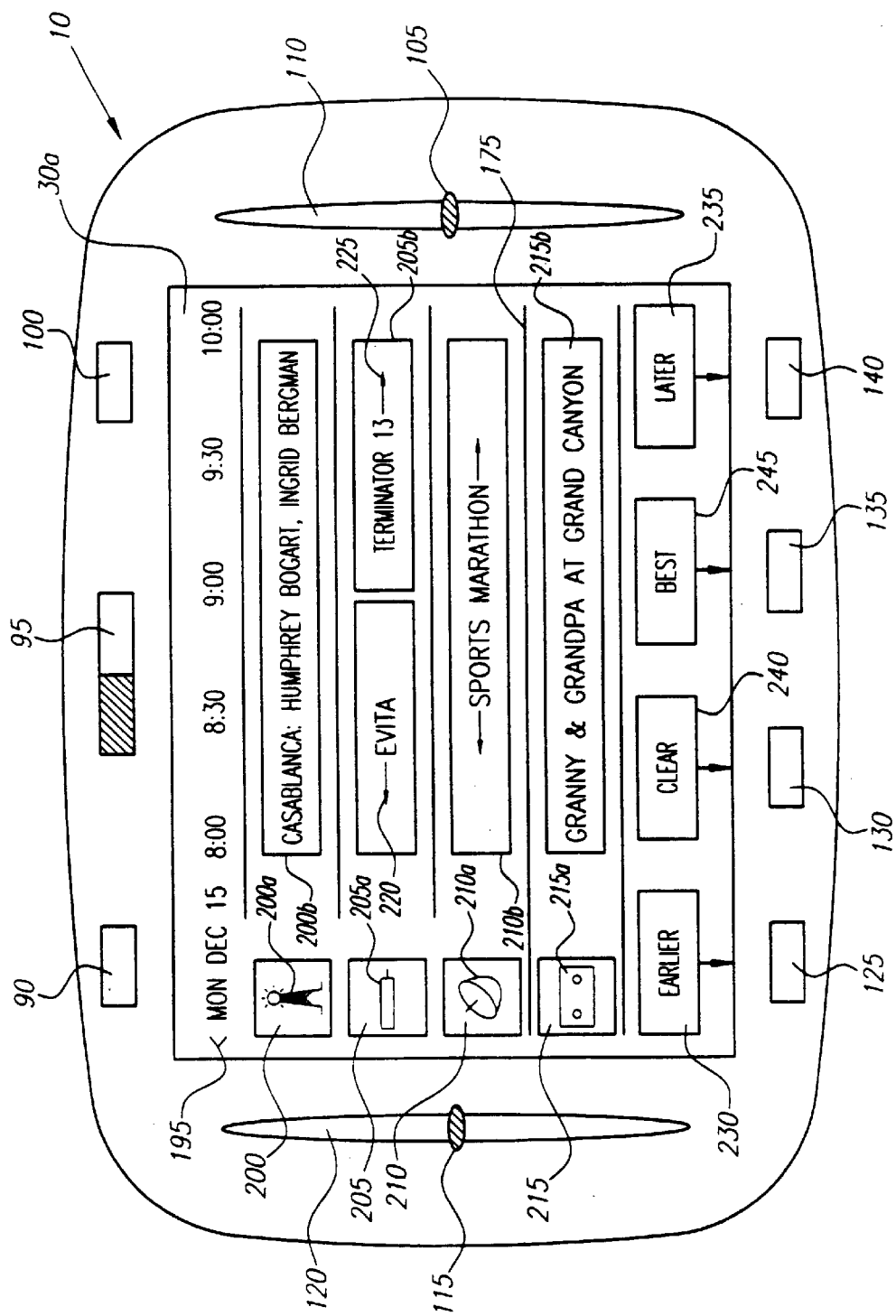
FIG. 6 shows the remote control of FIG. 2 displaying a preferred embodiment of the "List Alternatives" screen of FIG. 1 that is used in conjunction with the "Pictures" screen of FIG. 1 when the remote control is in an updates-enabled mode.
Figure 7:
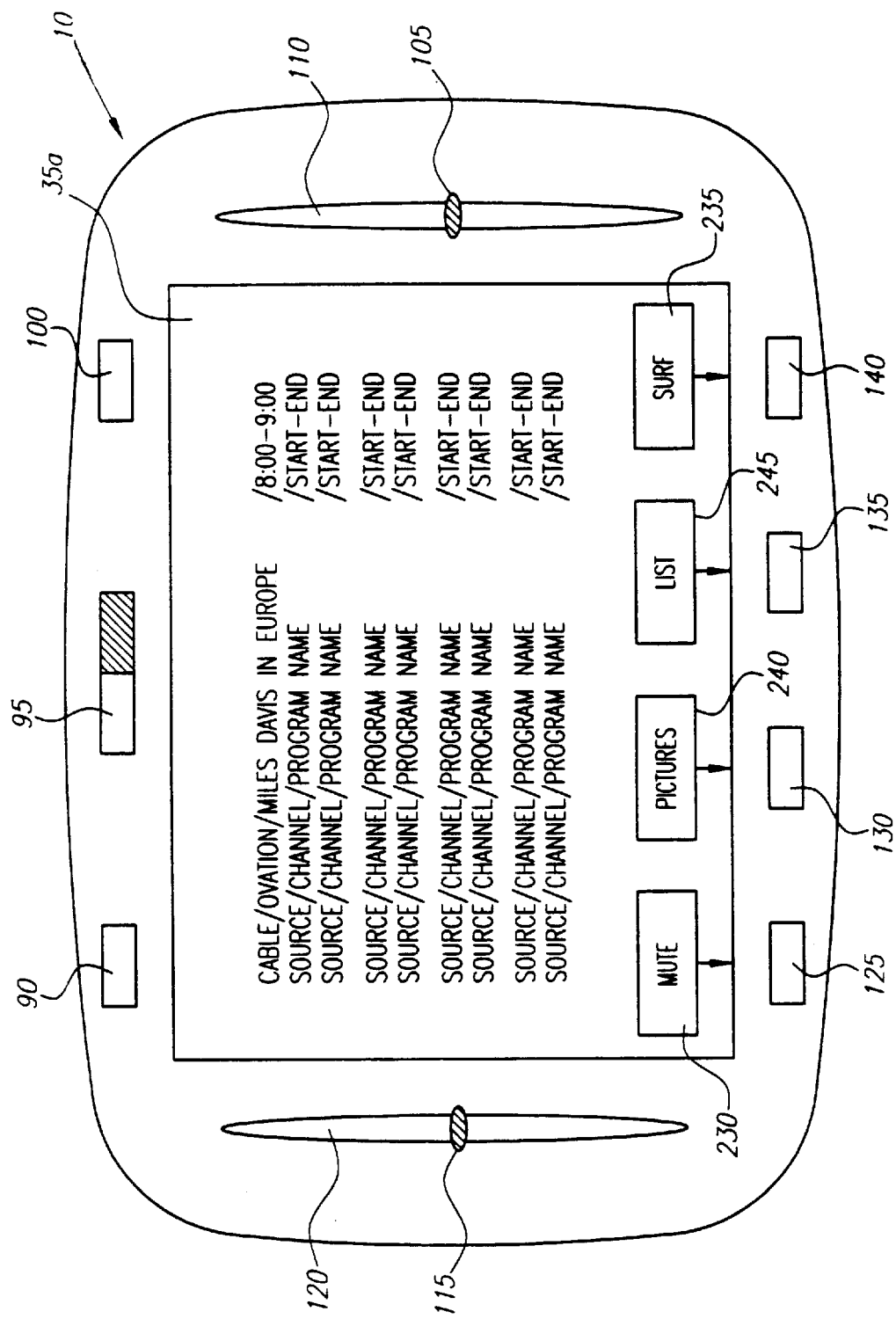
FIG. 7 shows the remote control of FIG. 2 displaying a preferred embodiment of the "Browse Favorite Alternatives" screen of FIG. 1 that is used in conjunction with the "Pictures" screen of FIG. 1.

Areas 185 and 190 are used in the "pictures" screen 20 as soft keys. Area 185 is used to allow the consumer to transfer from the "pictures" screen 20 to the "list alternatives" screen 30*a* as seen in FIG. 5 and FIG. 6 and which will be described shortly. Area 190 is used to allow the consumer to transfer from the "pictures" screen 20 to the "browse favorite alternatives" screen 35*a* as seen in FIG. 7 and which will be described shortly.

More specifically, by touching or otherwise selecting area 185, the integrated software presents the consumer with a "list alternatives" screen 30*a*, of which a typical layout is shown in FIG. 5 and FIG. 6. FIG. 5 shows the "list alternatives" screen 30*a* when the updates are disabled, as indicated by the position of button 95, while FIG. 6 shows the screen when the updates are enabled. Though the areas on the "list alternatives" screen 30*a* are preferably defined to occupy the same physical spaces whether the remote control 10 is in the updates-disabled mode (FIG. 5) or in the updates-enabled mode (FIG. 6), the actual information displayed and/or functions performed may vary depending on the mode. The display areas may be shaded differently in the different modes, to alert the consumer as to whether the remote control 10 is enabled for updates or not. Similarly, the various functions performed by the various buttons may be classified into categories such as: navigational, sending IR commands, controlling the screen (or functions associated therewith), or labeling or describing the function of some part of the remote control 10, and these categories may be immediately apparent to the consumer from the visual appearance of the buttons. With a color display 85, this could be accomplished by color-coding the various categories. Other methods of visually alerting the consumer as to the category that a particular button belongs to at any given time include using distinguishing text or graphics attributes such as fonts, shading, blinking, size, reverse-video, additional markers, etc.

Turning to FIG. 5, area 195 indicates the date, day, and timeline for the programs listed, as will be explained shortly. Areas 200, 205, 210, and 215 display icons 200*a*, 205*a*, 210*a*, and 215*a* respectively that indicate the source of the listed programs, while corresponding areas 200*b*, 205*b*, 210*b*, and 215*b* indicate the actual programs being considered by the consumer. For example, icons 200*a*–215*a* could represent broadcast TV, cable, satellite TV, and VCR respectively. To further promote the concept of title-based direct access control, it may actually be desirable to eliminate the icons 200*a*–215*a* from the display 85, as the actual source of the entertainment should be of little concern to the consumer. That would allow for more display area for other information. There may therefore be an option for the consumer to choose whether to have the sources indicated on the "list alternatives" screen 30*a*. The option may be available directly from the screen 30*a*, or it may be an option determined during initial configuration and setup of the remote control 10.

The display in FIG. 5 thus indicates that Casablanca is available on broadcast TV and covers the entire time-line (i.e., 8:00–10:00); Evita is available on Cable and started prior to 8:00 (as indicated by arrow 220) and ends at 9:00, at which time Terminator begins and continues (as indicated by arrow 225) past 10:00; Sports Marathon is available from satellite TV and started before 8:00 and ends some time after 10:00; and "Granny and Grandpa at Grand Canyon" is available from the VCR. If the consumer touches an area displaying a particular program (e.g., area 220), that program (i.e., Evita) will be tagged and added to the list of favorite selections and can then later be listed and browsed from the "browse favorite alternatives" screen 35*a*. If the program was already in the list, it would be removed therefrom. Programs that are already in the favorites list are highlighted in some manner (e.g., bold, italics, underline, or capital letters), so that touching the associated area would highlight or un-highlight the program and correspondingly add or remove the program from the list. Sources other than those shown in FIG. 5 may be available, in which case the consumer would be able to scroll the information on the display 85 vertically using slider 105. Other sources of picture entertainment may be a DVD device, a slide projector, a cam-corder, a closed-circuit camera, or some other device. Slider 115 is used to control the volume of the amplifier or amplifiers responsible for the audio portion of the current entertainment.

A line 175 is used to separate time-dependent "picture" entertainment from time-independent "picture" entertainment. Time dependent entertainment, as shown in FIG. 5, may come from a TV broadcast, cable, satellite broadcast, etc., while time-independent entertainment may come from a DVD device, video tape, cam-corder, etc. A similar line 175 may appear on the screens used in conjunction with the "music" screen 25, though such a line is not shown in the drawings. Time-dependent music may come from a radio or satellite broadcast, for example, while time-independent entertainment may come from a CD, tape, DVD, etc.

Areas 230 and 235 are used to indicate the functions of buttons 125 and 140 respectively, which are to scroll the information on the display 85 to the right or left showing the consumer which programs are available at earlier or later times. Preferably, the time-line as displayed in area 195 decreases or increases in half hour increments. When the consumer has scrolled to the beginning or the end of the time-line (as determined by the amount of information then stored in the memory of the remote control 10), the corresponding button 125 or 140 will become inactive, and the associated display area 230 or 235 will either become blank or have an appropriate icon indicating the button is inactive.

The "parent screen" button 130 returns the consumer to the "pictures" screen 20, as indicated in area 240, while the button 135 referred to by area 245 would allow the consumer to transfer directly to the "browse favorite alternatives" screen 35*a* without first having to return to the "pictures" screen 20. Note here that though areas 230, 235, 240, and 245 serve the same functions as areas 155, 160, 165, and 170 do in the "pictures" screen 20, namely to identify the functions of buttons 125, 130, 135, and 140, the areas have been identified by a different set of reference numerals to emphasize that even though the areas may occupy the same physical space on the display 85 in both screens 20 and 35*a*, that is not necessary. For example, the text describing the function of a button may vary in length from only a few characters to several words, in which case the latter would usually occupy a larger area of the display 85.

Turning now to FIG. 6, which shows the "list alternatives" screen 30a when the updates are enabled as indicated by the position of button 95, it can be seen that the areas on this screen are defined to occupy the same physical spaces as those on the screen in FIG. 5. However, that is not required, and some of the information displayed and/or the functions performed vary from that of FIG. 5.

For instance, with updates enabled, touching area 200, 205, 210, or 215 presents the consumer with a screen full of options available to control the attributes of the selected source. Thus, pressing or otherwise selecting area 200 presents the consumer with a screen to control the color, tint, balance, contrast, brightness, or other attributes of the TV display. In one embodiment, the screen presented may be a graphical representation of the actual proprietary remote controller manufactured specifically for the device being controlled. If the graphical representation could not fit entirely within the display area 85 of the remote control 10, a virtual representation could be displayed with scroll bars to allow the consumer to access the portions of the proprietary remote controller not then visible on the display 85. Integrated software is programmed such that the remote control 10 is responsive to commands entered via the graphical representation as if the commands were entered on the proprietary remote controller, and thus sends the same IR command sequence to the device or devices controlled by the proprietary remote controller as if the analogous commands were entered directly on the proprietary remote controller.

If a consumer wants to record a particular program without using the "scheduler" screen 45, this could be accomplished from the "list alternatives" screen 30a with the remote control 10 in updates-enabled mode as follows. The consumer touches or otherwise selects the program name from the display 85, and while continuing to touch or select the program name the consumer touches or selects a recordable media icon (e.g., VCR or DVD). If the time to record coincides with the time the consumer selects the program, the appropriate IR commands are then sent to the associated device to set the device for recording the selected program. If, however, the time to record is in the future, the remote control 10 programs itself to send the appropriate IR commands at the required time. The remote control 10 has an integrated real time clock for this sort of timing.

FIG. 6 also shows that the functions of buttons 130 and 135 are different than when button 95 is in the updates-disabled mode as in FIG. 5. Button 130 is used to "clear" the remote control's memory of the previously tagged or selected favorites (for the day, week, etc., depending on the consumer's configuration of the remote control 10), as indicated by display area 240, and would also cause display area 240 to then show "restore." Button 130 thus is used as a toggle to clear and restore lists of previously selected favorite programs. Button 135 is used to tag the previously selected program as the "best" for the specified time and day. The previously marked "best" program, if any, for the specified time and day would be replaced. As previously described, if the consumer subsequently presses the "best" button 135 from the "pictures" screen 20, the appropriate IR commands will are sent to the appropriate device so that the device switches to the program the consumer tagged as his or her "best" program as just described.

The "browse favorite alternatives" screen 35a, which may be accessed from either the "pictures" screen 20 or from the "list alternatives" screen 30a as previously described, is illustrated in FIG. 7. The display 85 here shows the list of programs selected by the consumer from the "list alternatives" screen 30a as previously described. If no selections were made, the default options (as set from the "update users" screen 70 described in connection with FIG. 16) for the current user, and optionally an appropriate message indicating that no selections had been made, would be shown. Button 130 returns the consumer to the "pictures" screen 20 as indicated by area 240, and button 135 transfers to the "list alternatives" screen 30a directly without requiring the consumer to first return to the "pictures" screen 20. Programmable button 140 is set to "surf" as indicated by area 235, and causes the display of the controlled device to cycle through all of the favorite selections, pausing on each selection for a predetermined amount of time, which time could be programmed by the consumer within a range of for example one second to ten seconds. Slider 105 changes programs between selected favorites, and does not require explicit selection of the source device because the scheduled data that is downloaded has already been associated with the proper IR commands.

Figure 8:
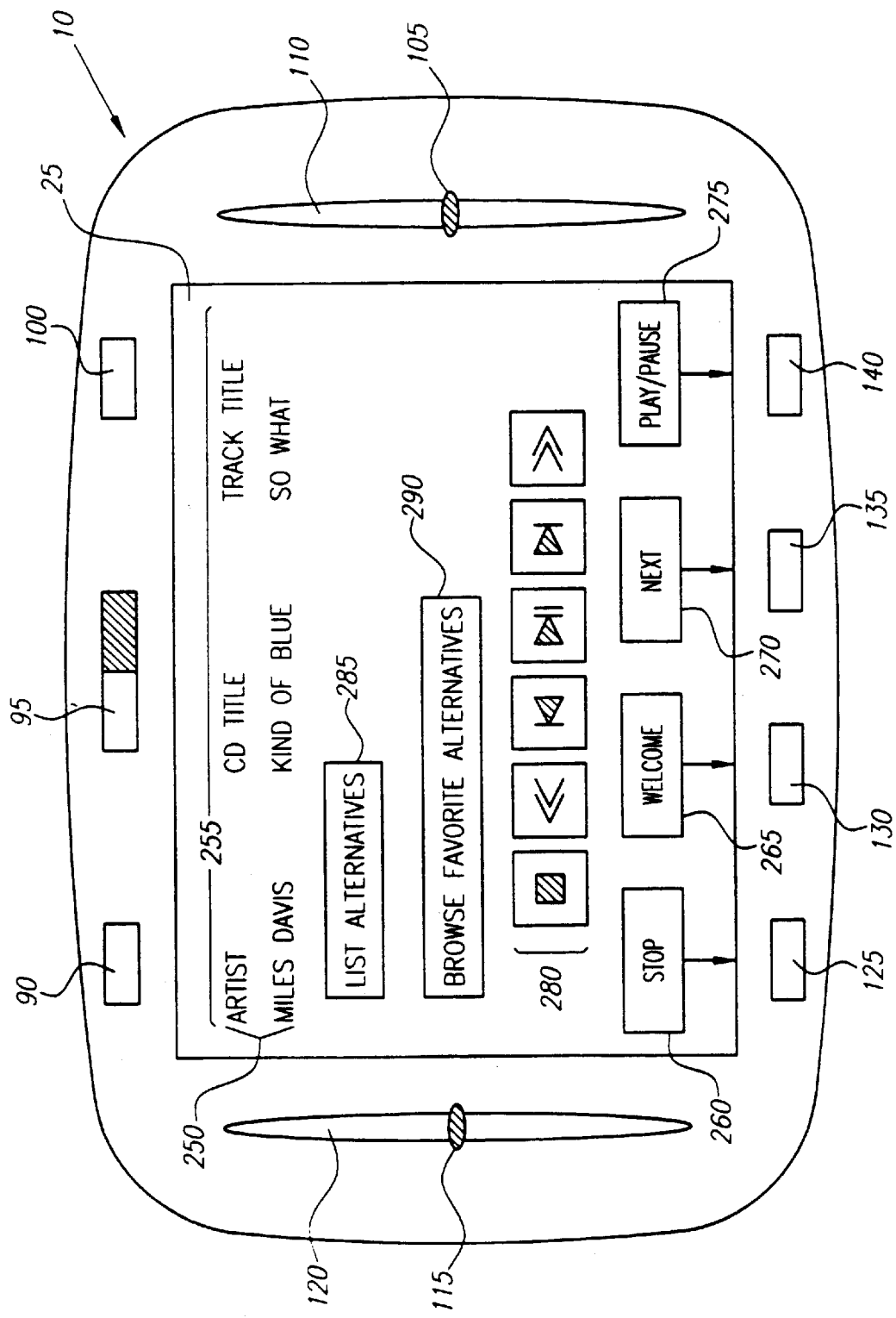
FIG. 8 shows the remote control of FIG. 2 displaying a preferred embodiment of the "Music" screen of FIG. 1.

The previously described screens were related to the control of visual media devices. A description of the screens that are related to the control of musical or sound media devices will now follow. FIG. 8 shows a typical "music" screen 25 of FIG. 1. Similar to the "pictures" screen 20 and to the other screens described herein, various areas on the display 85 are defined by the system component of the integrated software, and each area is used to display specified information to the consumer. Again, the exact layout is not important, and the examples to be described herein are illustrative of only one possible embodiment.

Turning to the examples shown in the drawings, and starting with FIG. 8, a first area 250 is used to display a description 255 of the current title being heard. The information will typically include the artist and title, and may also include other information such as the playing time, track title, device being controlled, or other consumer-defined data that may be associated with each title through the use of software. Areas 260, 265, 270, and 275 are used to indicate the current function of corresponding physical buttons 125, 130, 135, and 140. On the "music" screen 25, area 260 shows that button 125 is used to "stop" the title then being played. Area 265 indicates that button 130 returns the consumer to the "welcome" screen 15, which as seen in FIG. 1 would be the parent screen. Areas 270 and 275 indicate the functions of the programmable buttons 135 and 140 as "next" and "play/pause" respectively. Pressing button 135 from the "music" screen 20 thus sends the appropriate IR commands to begin playing the next title (e.g., the next song on a CD or DVD player, or the next CD or tape in a consumer-defined sequence) or switch to the next station on a radio, etc. Button 140 from the "music" screen 25 acts as a standard play/pause button on tape players. Of course, if these functions are not applicable to the device being controlled, areas 270 and/or 275 would be blank or otherwise indicate so, or the buttons 135 and 140 would be used for other applicable functions and those functions would be appropriately indicated in areas 270 and 275 respectively. Area 280 contains standard transport controls such as stop, rewind, start of previous track, play/pause, start of next track, and forward. Some of the functions shown in area 280 may also be available from the physical buttons (e.g., buttons 125 and 140 in FIG. 8).

Slider 105 is used to move forward or backward through the available music selection as would be shown in area 250, while slider 115 controls volume as with the "pictures" screen 20, although the specific amplifier controlled by slider 115 here, as well as the source of input into the amplifier, may differ from the amplifier controlled by slider 115 from the "pictures" screen 20 and the input source associated therewith.

Figure 9:
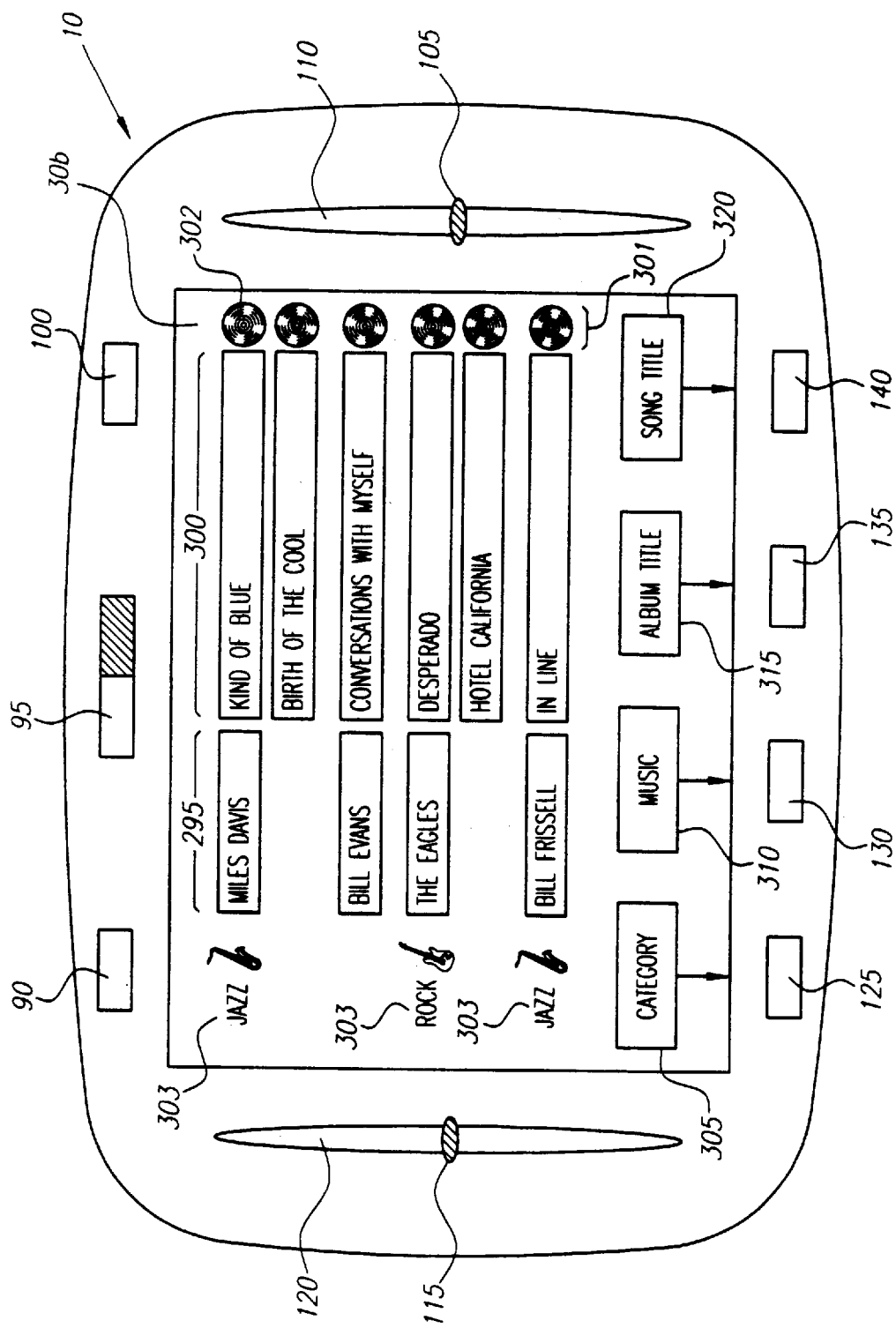
FIG. 9 shows the remote control of FIG. 2 displaying a preferred embodiment of the "List Alternatives" screen of FIG. 1 that is used in conjunction with the "Music" screen of FIG. 1.
Figure 10:
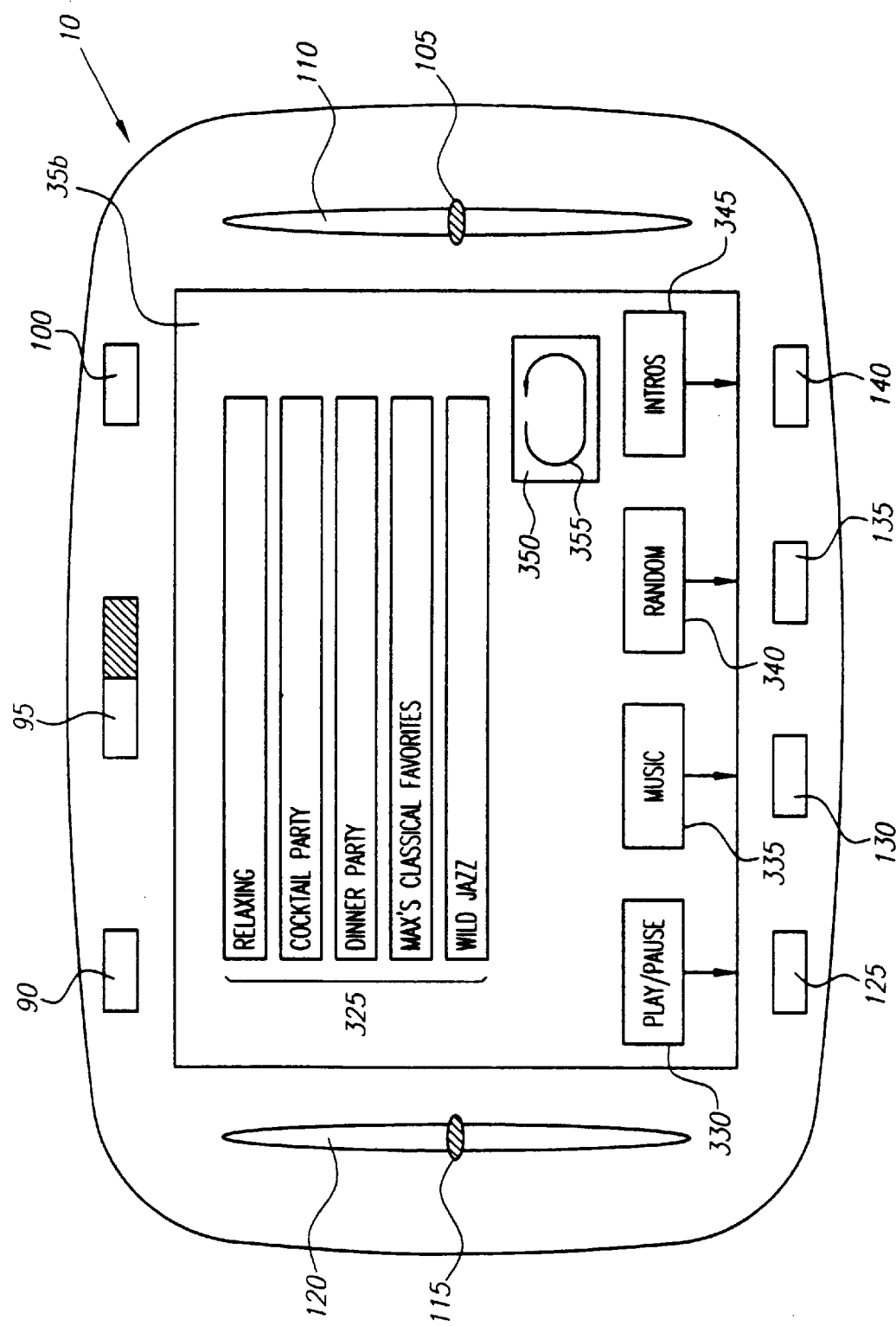
FIG. 10 shows the remote control of FIG. 2 displaying a preferred embodiment of the "Browse Favorite Alternatives" screen of FIG. 1 that is used in conjunction with the "Music" screen of FIG. 1 when the remote control is in an updates-disabled mode.
Figure 11:
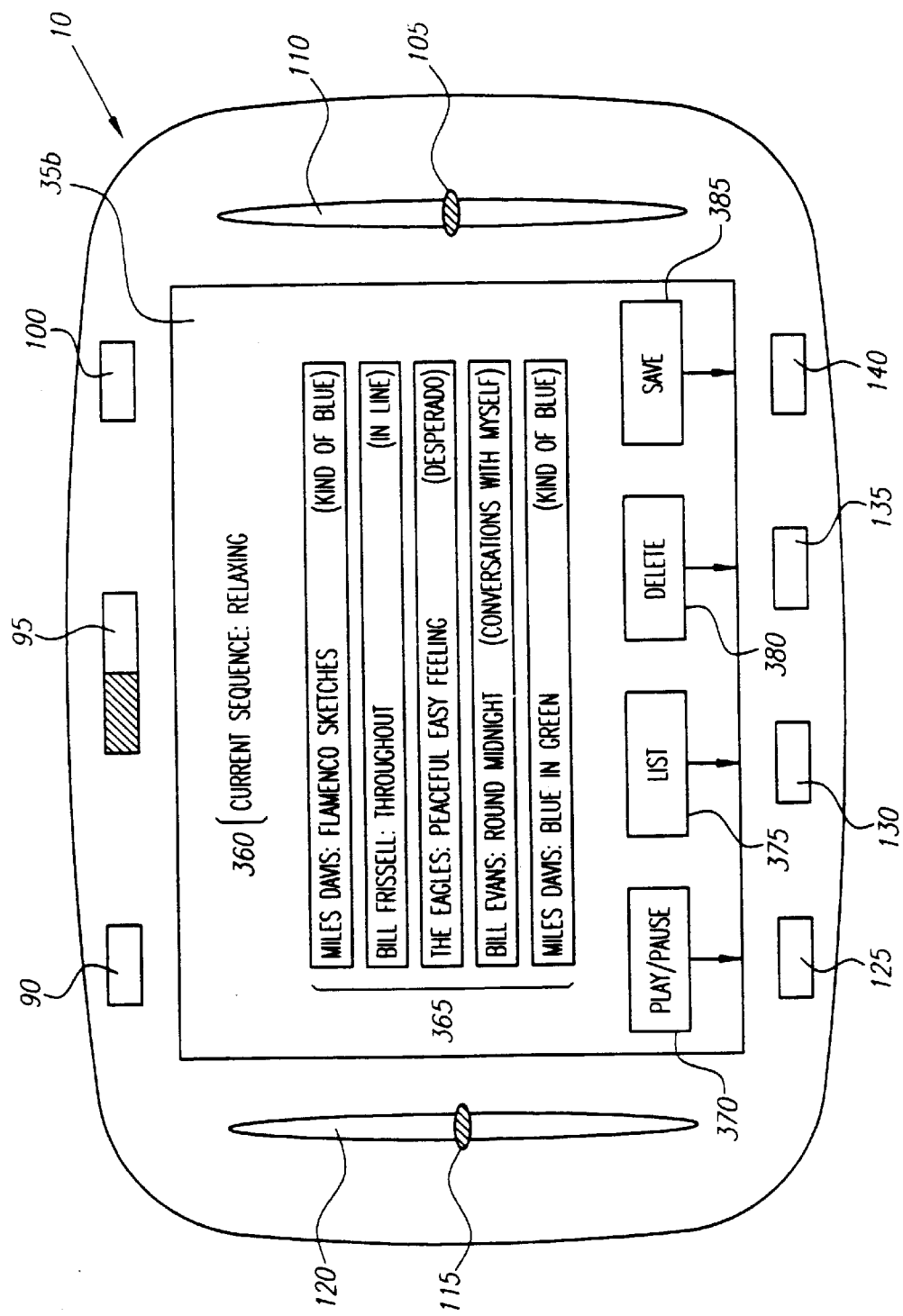
FIG. 11 shows the remote control of FIG. 2 displaying a preferred embodiment of the "Browse Favorite Alternatives" screen of FIG. 1 that is used in conjunction with the "Music" screen of FIG. 1 when the remote control is in an updates-enabled mode.

Areas 285 and 290 are used in the "music" screen 25 as soft keys similar to the soft keys described in conjunction with the "pictures" screen 20. Thus, area 285 is used to allow the consumer to transfer from the "music" screen 25 to the "list alternatives" screen 30b as seen in FIG. 9 and which will be described shortly. Area 290 is used to allow the consumer to transfer from the "music" screen 25 to the "browse favorite alternatives" screen 35b as seen in FIG. 10 and FIG. 11 and which will be described shortly. More specifically, by touching or otherwise selecting area 285, the integrated software presents the consumer with a "list alternatives" screen 30b, of which a typical layout is shown in FIG. 9, and of which the overall function of the screen 30b is similar as that of the "list alternatives" screen 30a used in conjunction with the "pictures" screen 20.

FIG. 9 shows that screen 30b contains the available artists 295 as well as the individual album titles 300 associated with the artists 295. Instead of or in addition to the album titles 300, graphical representations of the album covers may be displayed. If the consumer touches or otherwise selects an icon 302 within area 301, area 300 will change to list individual song or track titles for the album title associated with icon 302. In FIG. 9, for example, selecting the uppermost icon 302 causes the individual song or track titles associated with "Kind of Blue" to appear in area 301 for browsing and selecting. Area 295 may correspondingly change to display only the artist (Miles Davis in this example) of the currently selected album title. Icons 302 may be graphical representations of a CD as shown, so that the functions associated with the icons 302 (i.e listing individual song titles) is intuitive.

If the consumer touches an area displaying a particular artist (e.g., area 295a), that artist (i.e., Miles Davis) will be tagged and all titles associated with the artist will be added to the list of favorite selections and can then later be listed and browsed from the "browse favorite alternatives" screen 35b. If the artist was already in the list, the titles associated with that artist would be removed therefrom. Artists already in the favorites list are highlighted in some manner (e.g., bold, italics, underline, or capital letters), so that touching the associated area would highlight or un-highlight the artist and correspondingly add or remove the titles associated with the artist from the list. If the updates button 95 is enabled, the current set of selections may be stored as a sequence under consumer-defined labels such as "wild jazz," "party music," "relaxing music," etc.

Icons 303 or other text or both indicate the category of the associated album, disc, or other music sequence or collection based upon information derived from the CDDB internet database, the consumer, or another data source.

Button 125 is used to determine the order in which the selections are displayed. For example, the selections may be displayed in alphabetical order by artist name, in order of music genre, by album title or by any other criteria available, including consumer-defined criteria. Repeatedly pressing button 125 will cycle through the available sort options. Area 305 may indicate the current sort criteria in effect, or it may indicate the next available sort criteria to take effect if button 125 were pressed, as is the case in FIG. 9. In the latter case, another area of the display 85 may indicate the sort criteria in effect. Button 135 is used as a "hot key" to sort the information by "album title" (as indicated by area 315), or some other criterion commonly used by the consumer, even though the same criterion may be available through the cycling of button 125. Button 140 is similarly programmed as a "hot key" to sort the information by "song title" as indicated by area 320, regardless of the actual artist, album, CD, etc. which contains the title. This feature is useful for the consumer to directly access a desired song without the concern for who the artist is or what album the song is on. In addition, a search function may be available to allow the consumer to search for a specific artist, song title, album title, or any other text. Text may be entered using a graphical keyboard or an IR keyboard.

Slider 115 is used to control volume on the controlled device, while slider 105 allows the consumer to scroll through the list of available titles without actually affecting the music being heard or the display on the device or devices being controlled, or of any other device.

The "parent screen" button 130 returns the consumer to the "music" screen 25, as indicated in area 310. Note here that though areas 305, 310, 315, and 320 serve the same function as areas 260, 265, 270, and 275 do in the "music" screen 25, namely to identify the functions of buttons 125, 130, 135, and 140, the areas have been identified by a different set of reference numerals to emphasize that even though the areas may occupy the same physical space on the display 85 in both screens 25 and 30b, that is not necessary.

Referring back to FIG. 8, by touching or otherwise selecting area 290, the integrated software presents the consumer with a "browse favorite alternatives" screen 35b, of which a typical layout is shown in FIG. 10 and FIG. 11. FIG. 10 shows the "browse favorite alternatives" screen 35b when the updates are disabled, as indicated by the position of button 95, while FIG. 11 shows the screen when the updates are enabled. Though the areas on this screen are preferably defined to occupy different physical spaces depending on whether the remote control 10 is in the updates-disable mode (FIG. 10) or in the updates-enabled mode (FIG. 11), the actual information displayed and/or functions performed may be the same. The display areas may be shaded differently in the different modes, to alert the consumer as to whether the remote control 10 is enabled for updates or not.

Turning to FIG. 10, the "browse favorite alternatives" screen 35b for musical entertainment is shown with button 95 in the updates-disabled mode. The majority of the display 85 is devoted to listing the various sequences of music 325 as categorized by the consumer from the "list alternatives" screen 30b as previously described. Thus, consumer-defined music sequences such as "relaxing," "cocktail party," etc. will be available as seen in FIG. 10, as well as music associated with a particular artist or other source, if the consumer created such a category from the "list alternatives" screen 30b. When the consumer touches or otherwise selects the name of a music sequence, details associated with that sequence are displayed. If the consumer has not created any selections, all default music selections would be available. The default selections may be all available CDs, or a particular subset defined for the particular user, for example.

Area 330 indicates the function of button 125 as "play/pause," which causes the currently selected sequence to begin playing, or pause if it is currently playing. Area 335 indicates button 130 returns the consumer to the "music" screen. Programmable buttons 135 and 140 are labeled as "random" and "intros" by areas 340 and 345 respectively. Pressing button 135 thus plays the selected sequence one title at a time in random sequence, while button 140 causes the intros of each of the titles in the selected sequence to play sequentially, allowing the consumer to "surf" the available titles until a desired title is found. Pressing button 140 during "surf" mode would end the surfing and the then-selected title would continue to play its full length. The exact amount of time each title is played in "surf" mode may be programmed by the consumer, or it may be predetermined. A typical amount of time is about five seconds.

A soft key is displayed at area 350 with a symbol 355 or other text to indicate the function of the key is to cycle or repeat play of the selected sequence after it has reached an end. Area 350 acts as a toggle, and an indication of whether it is active may be established by highlighting or other means. Touching or otherwise selecting area 350 when it is active thus deactivates the cycle or repeat function, and un-highlights or otherwise indicates to the consumer that the function is not active.

For each of the applications where a series of titles is played sequentially (i.e., an album, random list, consumer-defined sequence, intros, etc.) the remote control 10 determines when a particular title is complete based on the track data or other data of the title as previously loaded into the remote control 10. Thus, if a first IR command is sent to play a first title (song) that lasts three minutes, the remote control should theoretically send the next IR command (for the second song to be played) three minutes after the first command was sent, and continue on sending the third IR command for the third song after a predetermined time had passed that is equal to the known play-time of the second song, etc. However, that might not accomplish the desired goal of having each song played in its entirety, because the start-time of each song might not occur immediately after the end-time of the previous song due to physical load and seek time of the song-playing devices. This problem is solved by one of the following methods.

First, there may be logical cue commands in each sequence between the end of one song and the start of the next. For example, on a multiple-disc CD player, in a sequence which contains disc 3 track 4 followed by disc 148 track 9, the remote control 10 will send a cue command when disc 3 track 4 finishes playing to load disc 148, and set the CD player in pause mode ready to play track 9. After a predefined delay, the remote control 10 will send a "play" command to start track 9. If this is followed in the sequence by track 10 on the same CD, the cue command in this case would be a null command—no additional IR commands need to be sent to the CD player. The insertion of cue commands in program sequences will normally be hidden from the consumer, but if the consumer wishes to customize the cue delay for some CD players (e.g., if disc loading is especially slow or fast for that device), the consumer may do so.

The remote control 10 determines whether to send the next IR command, and whether a delay is needed before starting the internal timer to begin counting down the play-time of the next song. Factors considered are the physical location of the current title to the previous title, and the physical specifications of the devices being controlled, as described above, all of which are known to the remote control 10.

More specifically, it may take some time, up to several seconds, for the next song to actually begin playing due to the mechanical load and/or seek time. Thus, if two consecutive songs are located physically on consecutive tracks of a single CD, the remote control 10 would not send a new IR command to begin playing the second song because the second song will begin play automatically in sequence immediately after the previous song had completed play. If, however, the second song was on a later track of the same CD, or a different CD in the same CD tower, or a different CD in a different CD player, the remote control 10 would send the IR command to begin play of the second song, then to pause the CD player, and then would wait a predetermined amount of time, before sending an IR command to disengage pause mode and begin counting down the play-time of the second song. The predetermined time would be chosen conservatively to err on the side of extra delay, so that the remote control 10 would not consider a title to be done playing prior to it actually being so, which could be the case if the timer were started prior to the actual start of the title. If a consumer detects that the delay is routinely too long, the consumer may reset the delay time to be a shorter time by using an option from the "updates" screen 60 or another screen. For media-playing devices that have the ability to send IR commands, a command can be sent by the device to the remote control 10 acknowledging the completion of a title, and the determination of an appropriate delay time would be unnecessary.

Slider 115 is used as a volume control button as on the "music" screen 25, and slider 105 is used to select a particular sequence of those available.

A preferred view of the "browse favorite alternatives" screen 35b for musical entertainment in the updates-enabled mode is shown in FIG. 11. In an area 360 at the top of the screen is a description of the sequence currently being updated. The description is typically supplied by the consumer, but may be automatically supplied by the integrated software or other software based upon how the sequence is selected. For example, if the consumer selects a sequence based on variables already known to the software, such as by album, CD, artist, etc., the software may provide the description to correspond to the known variables. In either case, the consumer will be able to edit the sequence name if desired. The main area 365 of the screen is devoted to listing the individual titles in the currently selected sequence. The titles are preferably listed in the order in which they will play, and the consumer may alter the order by touching or otherwise selecting a particular title, and then "dragging" the title to the desired location within the sequence. Slider 105 is used to scroll through the information on the screen.

Button 125 is used as a "play/pause" key as indicated by area 370, similar to its use as described in connection with FIG. 10. Area 375 indicates that button 130 returns the consumer to the "music" version of the "list alternatives" screen 30b, where the consumer could then add more titles to the sequence if desired. To delete a title from the sequence, the consumer would select the title and then use button 135, as indicated by area 380 which displays "delete." Area 385 shows that button 140 is used to "save" the current sequence, which may have been modified due to deletion of titles, and/or rearranging of titles as explained. A pop-up dialog box at that time would provide the consumer the opportunity to change the description of the sequence if so desired.

Figure 12:
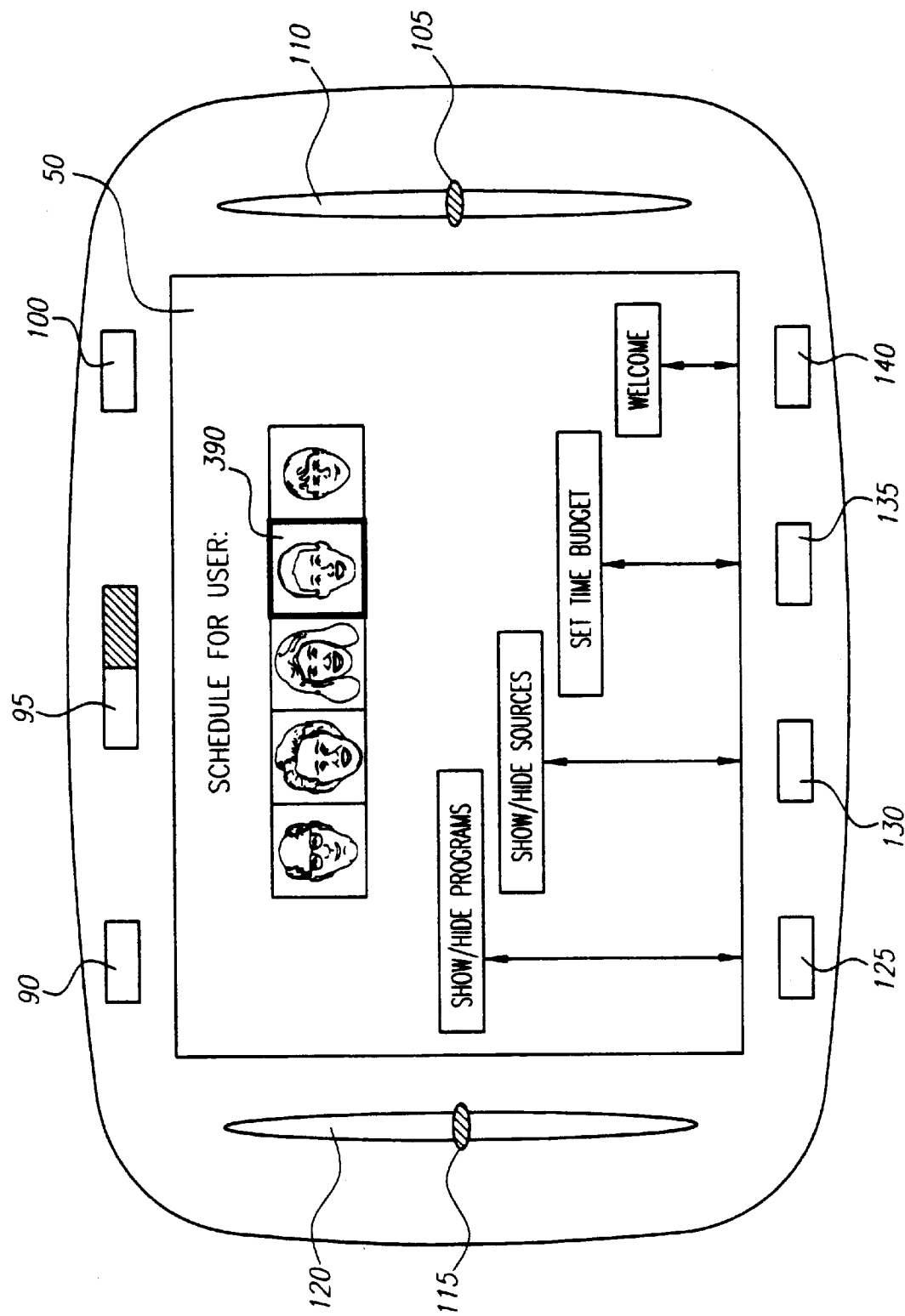
FIG. 12 shows the remote control of FIG. 2 displaying a preferred embodiment of the "Current & Future Programs" screen of FIG. 1.

"Scheduler" screen 45 is not shown in the drawings, but typically will be a simple screen allowing the consumer to select a lower-level screen, which in FIG. 1 are shown to be the "current & future programs" screen 50 and the "past programs" screen 55. FIG. 12 shows a typical "current & future programs" screen. This screen allows a particular user to control the programs and/or sources available to them and other users. Depending on the user currently "signed on," (as will be described herein) the particular users' settings that can be modified may differ. For example, a parent with a "supervisor" password may have access to all users' settings, while a child may have access only to their own settings. The particular user whose settings are being updated is indicated by highlighting (as seen in FIG. 12 at 390) or other means.

This screen allows the sources, and/or individual programs from those sources to be made unavailable to specified users, as seen by the function of buttons 125 and 130 as displayed on the display 85. Thus, a parent could set a child's settings such that the child could not access the TV during certain time periods; or not access certain channels of the TV; or not access certain programs within a certain channel of the TV, etc. Programming of these limits are what has been referred to herein as filters. The purpose of the filters is simply to limit or deny access to certain entertainment or control of other devices as seen fit by the user with the authority to do so. Thus, a parent could create filters that cause only a predetermined subset of the title-based descriptions in the memory of the remote control 10 to be displayed to a particular user.

Another feature that may be available is the use of a time budget for certain users. Thus, a parent could limit the total TV time of a child using this feature. This could also be accomplished by use of a "smart card" which the parent can create with predefined amounts of time, and which the remote control 10 could then update each time the card was used. The smart card may also have identifying information encoded thereon such that the remote control 10 could identify the user. Of course, the remote control 10 may still require the user to enter a password to gain access to its activating features, in order to prevent an unauthorized user from using the smart card. Button 140 returns the consumer to the "welcome" screen 15.

Figure 13:
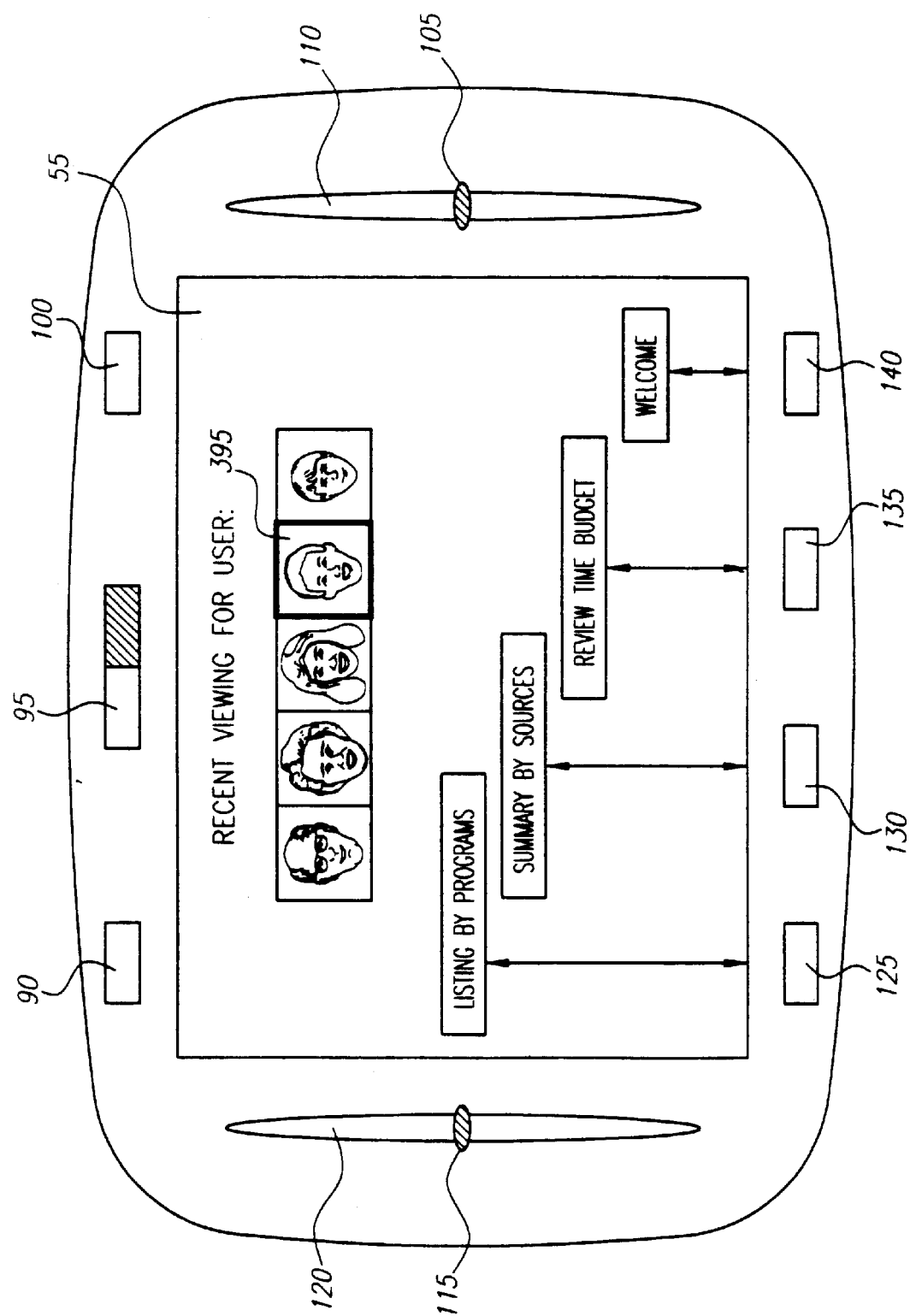
FIG. 13 shows the remote control of FIG. 2 displaying a preferred embodiment of the "Past Programs" screen of FIG. 1.

The "past programs" screen 55 is shown in FIG. 13. The screen layout is similar to that of the "current & future programs" screen 50 as seen in FIG. 12, but that is not required. The purpose of this screen 55 is to allow review of what a particular user has used the remote control 10 for. The integrated software tracks the specific IR commands sent by the remote control 10, and associates the commands with a particular user based on the password or other means used to activate the remote control prior to the programs being selected that resulted in the IR commands being sent.

Button 140 returns the consumer to "welcome" screen 15 as in the "current & future programs" screen 50. The other buttons, however, provide new functions. Pressing button 125 results in a display of which programs the particular user being reviewed has seen. Again, the user being reviewed may be indicated by highlighting as seen in area 395, or by other means. The programs are preferably sorted in chronological order, with the most recently viewed or listened to program appearing on top. However, any sort order may be used, and options to select the sort order may be available. Button 130 is a "hot key" to provide the summary sorted by source, as just described. Button 135 allows review of the time budget of the user being reviewed, and may be used in conjunction with a "smart" card if the smart card feature is available, so the reviewing person (usually a parent) would have extra monitoring means to ensure the reviewed users (usually the kids) are not abusing their privileges.

Figure 14:
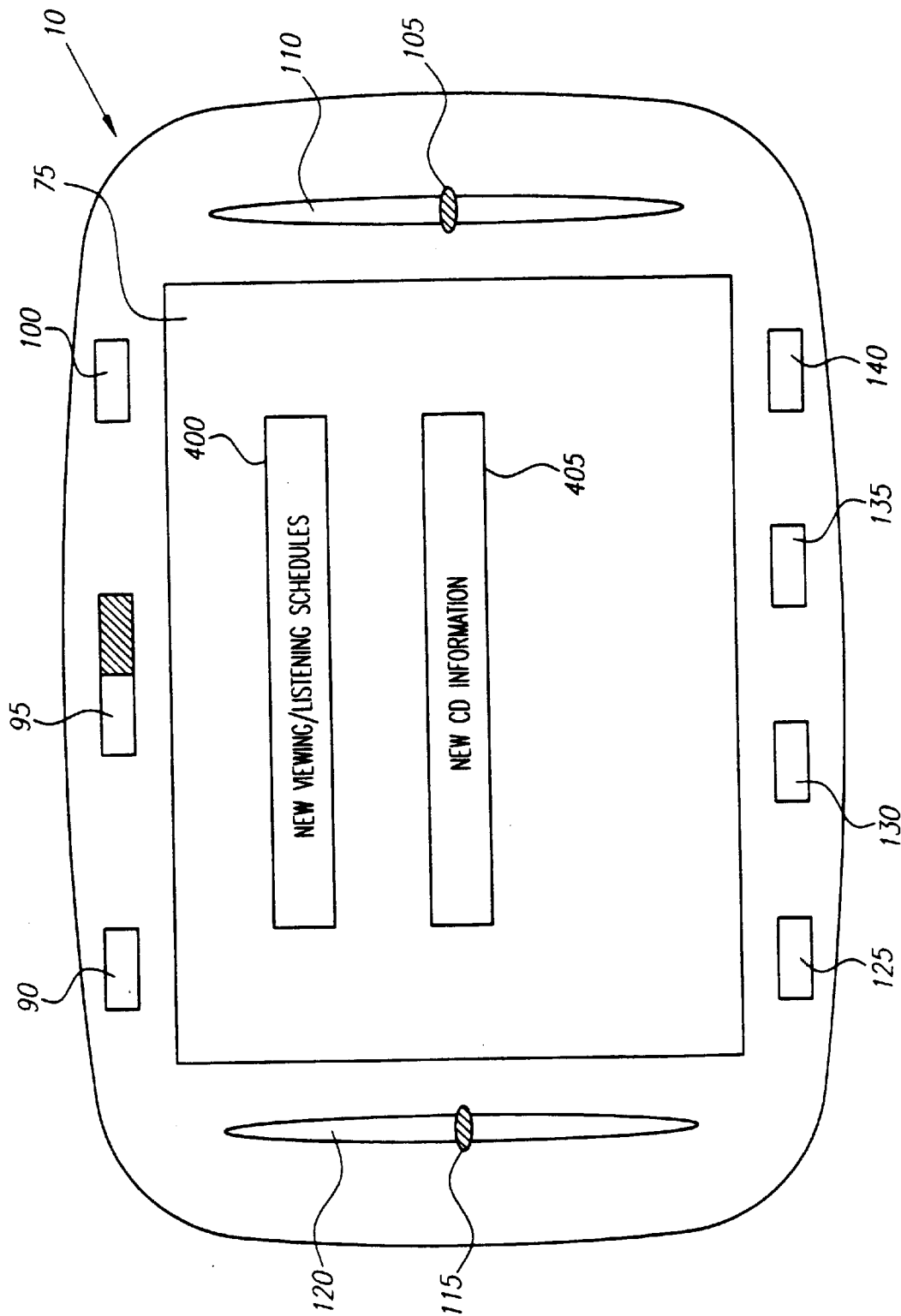
FIG. 14 shows the remote control of FIG. 2 displaying a preferred embodiment of the "New Info" screen of FIG. 1.

The "updates" screen 60 is not shown in the drawings, but similar to the "scheduler" screen 45, this screen 60 will typically just provide the consumer with the options of selecting the available lower-level screens, which as seen in FIG. 1 would be screens 75, 65, 70, and 80. The "new info"

screen 75 is shown in FIG. 14. This screen simply provides soft keys 400 and 405 which allow the consumer to update certain information then known to the remote control 10. Key 400 would be used to download new viewing or listening schedules which may have been recently obtained from the internet and which reflect the next day's or next week's programming. Key 405 would be used to update information regarding the available CD collection. For example, the consumer may have purchased new CDs, or removed some others from the CD player, and the relevant information would need to be loaded into the remote control 10 so the actual CDs correspond to what the remote control 10 has stored in its memory.

Figure 15:
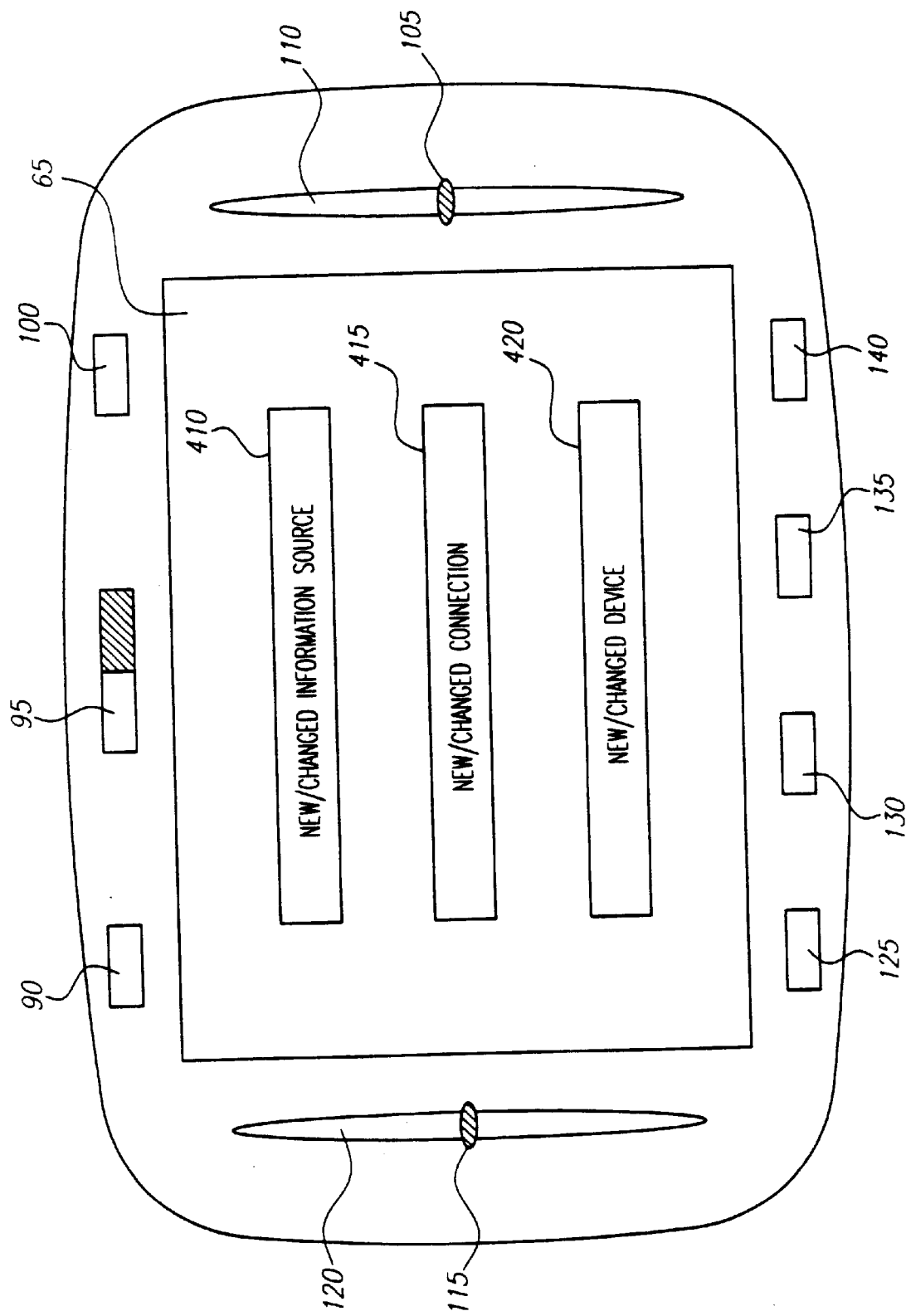
FIG. 15 shows the remote control of FIG. 2 displaying a preferred embodiment of the "Update Info" screen of FIG. 1.

The "update system" screen 65 is shown in FIG. 15. This screen presents the consumer with soft keys for various options to update system variables. For example, if the consumer changes internet service providers (ISPs), the requirements for accessing the ISP can be updated using soft key 410 labeled "new/changed information source." Similarly, if the access method is changed (e.g., from one of USB, IrDA, RS232, modem, etc. to another of USB, IrDA, RS232, modem, etc.), this information may be communicated to the remote control 10 by a soft key 415 labeled "new/changed connection." Another available option is to identify a new device to or delete an old device from the devices known to the remote control 10. This is accomplished from a soft key 420 labeled "new/changed device." For identifying a new device, the IR command library for the device must be loaded into the memory of the remote control 10. If the proper library is certain, for example if the library is associated with the exact make and model of the device, then the identified library may simply be loaded. If, however, it is not certain whether the library to be loaded is the proper library, the consumer may be required to load the library and then test the remote control 10 to determine if the library was the correct library. This may have to be repeated until the proper library is verified.

In the case where it is uncertain if the library to be loaded is the proper library, the consumer may have to load, test, unload, load, test, unload, etc. repeatedly until the proper library is identified. Or to avoid this, the consumer may load multiple libraries at once, and then cause the remote control 10 to cycle through the selected set of libraries, testing each library until the proper library is determined. If the device has the capability of sending IR communications, and the remote control 10 has the ability to receive IR communications, the device could signal the remote control 10 once the proper library has been identified, and the remote control 10 could then cease the testing cycle. The consumer could then purge the unnecessary IR command libraries from the memory of the remote control 10. If, however, the device does not have the ability to send IR communications, or if the remote control 10 does not have the ability to receive IR communications, then the consumer may be required to monitor the testing cycle to manually halt the cycle once the proper library is determined, and to thereafter program the remote control 10 to associate the identified library with the device and optionally to purge the other libraries that were being tested. Even in that situation, however, there is an advantage to being able to use the remote control 10 to cycle automatically through libraries and test them in an attempt to find a desired library to operate the device. The consumer has only to issue one command (i.e., a "cycle and test" command), instead of several commands (i.e., "test library #1," "test library #2," "test library #3,". "test library n."). The consumer is thus free to watch a program uninterrupted, and will be interrupted only when the remote control finds a desired library, or otherwise indicates that none of the available libraries can operate the device.

So cycling through a series of IR command libraries after loading the series of libraries into the memory of the remote control 10 is accomplished by actuating only one button on the remote control 10, which causes the cycling to begin. The cycling then automatically occurs, and comprises selecting a library, sending an IR command associated with the selected library from the remote control 10 to the device, determining if the device responded to the IR command sent, and then continuing on to test the next library in the same manner (or automatically stopping the cycle if the device communicates back to the remote control 10 to indicate that the device recognized the command sent). The consumer may hit a "stop" button on the remote control 10 to end the cycling, for example when it is determined that the proper library has been found, or for any other reason.

Other options available from the "update system" screen 65 could be an option to allow the current settings (for all users) to be saved onto an alternate storage device, such as another remote control, a PC's hard disk, a tape or floppy disk backup, etc., or an option to access information about the technical specifications of the device, with phone numbers of the manufacturer or other available help sources. Other miscellaneous options related to the overall maintenance and programming of the remote control 10 could also be available from this or other screens.

Both the "new info" screen 75 as shown in FIG. 14 and the "update system" screen 65 as shown in FIG. 15 may vary in both appearance as well as in functionality depending on whether the remote control 10 is being used in conjunction with a PC to access an outside data source. For example, the "new/changed information source" soft key 410 may not be applicable if information was being loaded from the PC, even though the source of the information downloaded to the PC may have changed.

Figure 16:
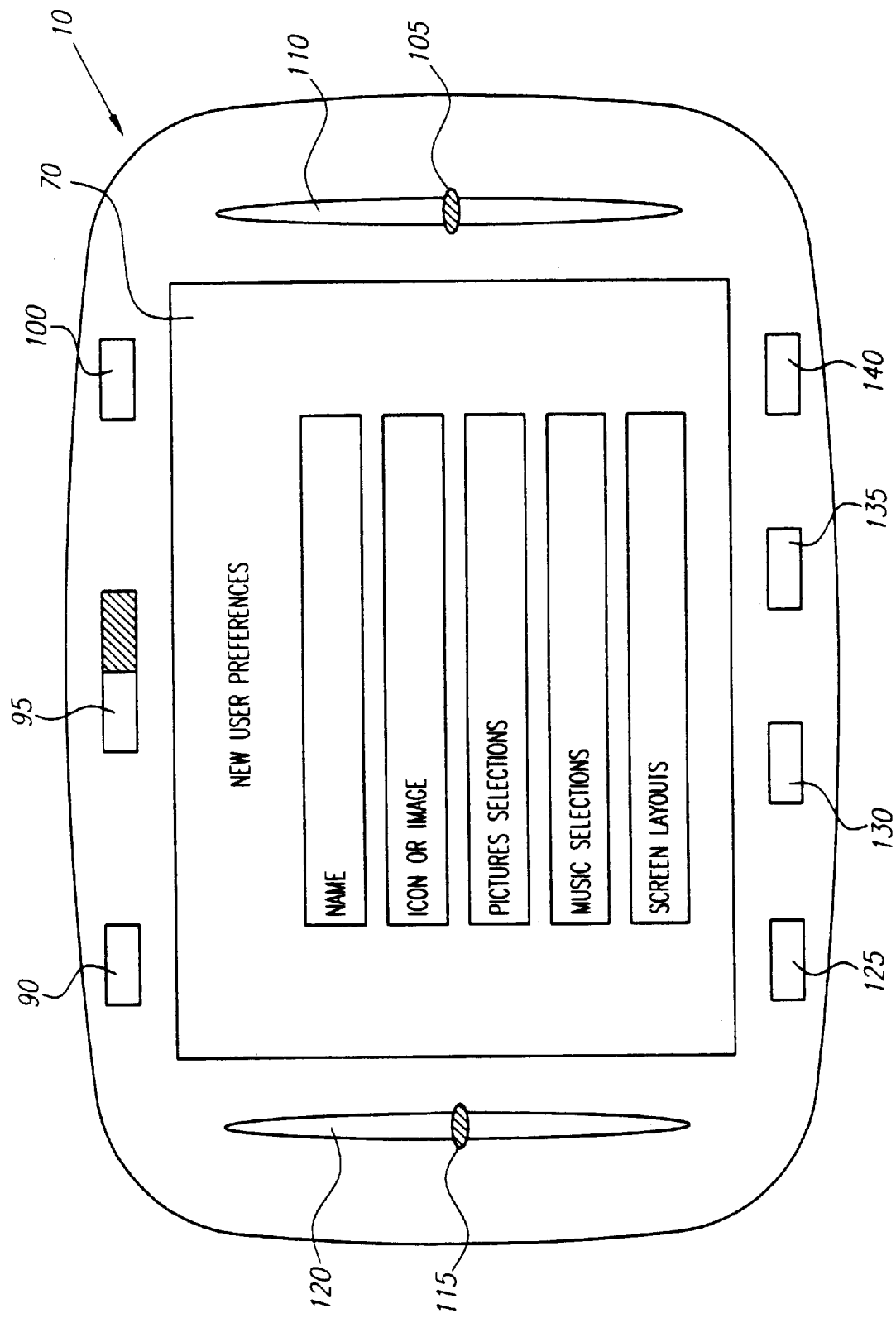
FIG. 16 shows the remote control of FIG. 2 displaying a preferred embodiment of the "Update Users" screen of FIG. 1.

FIG. 16 shows the "update users" screen 70, which is where all of the settings are made for each individual user's profile or configuration. Thus, each user may select their screen name, the associated icon or image, which pictures and music selections they would prefer to exclude from those available, and to some degree the screen layouts that they will see. The name and icons are simply used to identify the user on the other screens, so it is clear which user is currently signed on, or which user is being reviewed, whichever the case may be. The pictures and music selections may be used, for example, if a child does not want to have to sift through mom and dad's music but would prefer instead to only sift through his or her own collection. In that case, the child could set their default to not show mom and dad's music when listing available music, so there would be less information to browse through.

The screen layouts option allows the user to select from a predefined set of possible layouts that might be more visually pleasing or easier to use. For example there may be one layout with cartoon icons suitable for children, another with the minimum number of on-screen buttons for those who prefer less clutter, another with designer patterns, etc. In addition, within a predefined layout each user may customize the screen layouts using available field-manipulation commands, as will be described shortly. Other options set here, though not shown in FIG. 16, include the user's password and possibly the user's security level, which would determine which other profiles the user could access and/or update.

Figure 17:
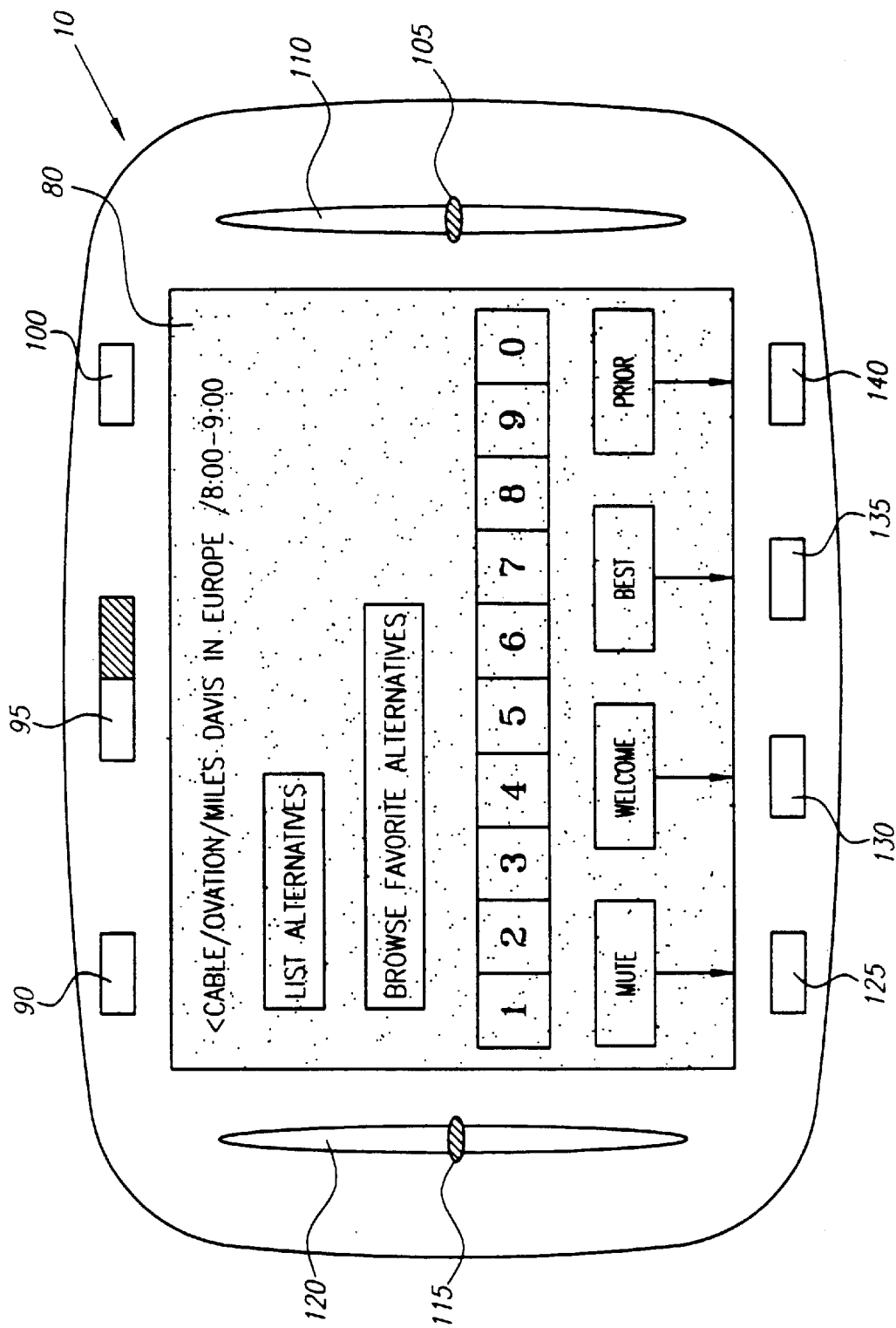
FIG. 17 shows the remote control of FIG. 2 displaying a preferred embodiment of the "New Screen Layout" screen of FIG. 1.

Another available option from the "updates" screen 60 is the "new screen layout" screen 80, as is seen in FIG. 17, and the screen is preferably shaded, as seen, to indicate that the information being viewed is not available for actual use, but is instead available only for changing its layout. The screen shown in FIG. 17 is the "pictures" screen 20 as seen in FIG. 4.

A particular area on the screen may have a button added or deleted, moved to another area, sized, or edited. The various functions could be accomplished by touching or otherwise selecting the area, then holding down the appropriate physical button 125, 130, 135, or 140 while continuing to touch the area. The functions of buttons 125, 130, 135, and 140 in this context are not displayed, as doing so would impede the view of the current layout being updated. It may be desirable, however, to display the associated functions in a very small font just above the buttons, such that their function is apparent and the screen layout is only minimally impaired. Otherwise, the consumer could view the information from a help screen (available by using button 100), or simply know the functions of the buttons from reading an associated manual or becoming accustomed to their use in this context.

To add an area on the screen layout, the consumer selects the area, and a pop-up menu appears with various types of shapes, etc to choose from. If the area already has an object associated with it, then pressing the add/delete button would delete the object (possibly after confirmation) associated with the area. To move an object on the layout, it could be touched and "dragged," or it could be moved by selecting a final destination. Sizing an object may occur similarly by touching and dragging (away or towards the center of the object to increase or decrease its size respectively), or by otherwise selecting a final desired size. Editing an object causes a pop-up menu to appear with the available options to edit. Options include the name, the image, the function (label, navigation, sending IR commands, edit, etc.), a copy and a paste option, and save and exit options.

Another possible method of creating screen layouts is through the use of the internet HTML (Hypertext Markup Language). The remote control 10 will be compatible with and understand most and preferably all of the constructs of HTML, which is used to define the layout of web pages. It is therefore possible, when programming with companion PC software, to use one of the many available web page design tools to design a customized set of screens. However, the HTML format will only be used for defining the look of the screens. Other programming concepts would be needed to associate functionality with the various HTML customized screen areas.

To get to a particular screen layout to update, the consumer could navigate to the desired screen and press a hot key on the screen to switch to screen-update mode (though such a hot key is not shown in the drawings). Or a selection of available screens may be presented to the consumer from the "new screen layout" screen 80.

Turning now to the "other" screen 40 (which is not shown in the drawings), this screen 40 provides other functions not previously discussed. For example, control of kitchen appliances, a web browser on an advanced TV, a security system, a baby monitor, etc. may be accomplished through options presented on the "other" screen 40. Another option could be a pre-loaded list of popular web sites from which useful information could be downloaded. Control of other consumer devices may be performed from the "other" screen 40 as well. An option may be available to "close down" all devices, such that selecting the option causes all devices under control of the remote control 10 to power-down. The preceding examples are only illustrative, and by no means limiting of the types of function that could be available from the "other" screen.

A preferred embodiment of the remote control 10 of the present invention has just been described in relation to how the remote control 10 would be used to control visual media, sound media, and other devices. It is to be understood for these descriptions, that the specific screen layouts, navigational algorithms, and described functions of the buttons, may be modified greatly without departing from the concepts of the present invention.

Several examples have been provided of the type of data from the internet or other data source that could be loaded into the remote control 10. Some of those examples will be discussed in more detail here, along with other examples, as this is an important aspect of the invention. One application would allow the consumer to load TV schedules appropriate to their area into the remote control 10, and then list and browse the schedules. One person could be browsing the schedule of programs available on alternative channels, without disturbing the view of others who are watching the primary screen such as the TV. If an alternative program is more appealing, it could be selected from the remote control 10 by simply touching the particular button corresponding to that program. The schedules may be provided by subscription, or by an arrangement between the vendor of the remote control 10 and third parties supplying the information. A similar technique is used to select a program to be recorded on a VCR.

Another application would allow the consumer to load information relating to the consumer's entire CD collection into the remote control 10. Once the CDs are catalogued and then stored in a multi-disc CD player (units holding up to 200 CDs or more are common), the consumer could choose which music to play using only title-based direct access control. That is, the consumer could select by album or song title rather than by track numbers or slot numbers. And as previously described, individual sequences may be defined for specific moods. This method of browsing and selecting music differs from that of the currently available Sony S-link control bus system, because unlike the Sony system, the present invention allows the selection and display of titles on CD players from multiple manufacturers and does not require the use of a TV at all, let alone a specially-equipped Sony TV. Furthermore, the process of entering the descriptive data for the CD collection is greatly simplified, because the data can be loaded from the internet. Or the data can be loaded from a PC or other data source. A device (such as a PC) with a digital CD drive (CD-ROM, CD-R, CD-RW, or any type of software-controllable CD drive) could gather the information needed to load into the memory of the remote control 10. In one embodiment, the remote control 10 has an integrated CD drive, and in another the remote control 10 has hardware to connect to a CD drive. In each case, the CD drive may be compatible with standard CD sizes, or smaller or larger CDs, or any combination thereof. In any of the cases described, the consumer does not have to individually enter the information for each CD, but instead is able to use an automated device such as a CD drive to gather the information, and then use the information to gather associated information and title-based descriptions from an outside data source such as the internet. The CD information read by the CD drive, and the associated information and title-based descriptions from the outside data source, may then be loaded into the memory of the remote control. A preferred method includes the consumer placing a CD in the CD drive of a PC (or of the remote control 10, or of any CD drive accessible by the remote control 10), such that the track data can be appropriately read. Software can derive the track name, title, artist, playing time, and other information from the internet CDDB database, and the data can then be downloaded into the remote control 10. The consumer would place the CD in the CD player, and inform the software of the location of the CD within the CD player. When the consumer later selects or otherwise works with titles from a particular CD by browsing information on the display 85 of the remote control 10, the necessary IR commands are already associated with any tasks the consumer would want to perform that involve the particular titles.

Another example of the type of data that the remote control 10 could download is of course the IR libraries or protocols for specified devices. Though the remote control 10 will preferably be pre-loaded with a significant set of IR libraries for known manufacturers and devices, there may be some devices for which the protocols are not pre-loaded. In the latter case, the data (IR protocol) for a specific device could be loaded from the internet or other data source.

Reviews and other details of particular movies may be loaded into the remote control, and are currently available at internet sites such as the Internet Movie Database (http://www.us.imdb.com). "Playlists" may be compiled by friends, family members, or other third parties such as movie critics, comprising title-based descriptions such as recommended viewing or listening, and the remote control 10 may be programmed to load the playlists into its memory such that the consumer may list, browse, edit, and select programs from the playlists.

The examples provided herein are illustrative of the types of information that can be loaded into the memory of the remote control 10, but by no means are the examples provided to be exclusive. The important concept is that data related to the control of consumer devices may be obtained from an independent data source and loaded into the remote control 10 such that the remote control 10 can control the consumer devices in a manner described herein as title-based direct access control. Software, which may be PC software, integrated software, or some other software, controls the loading of the data into the memory of the remote control 10. The software also controls the associations needed to present a unified set of screens to the consumer which associate the appropriate layouts with the appropriate physical and on-screen actuating buttons such that the consumer may exercise title-based direct access control of the consumer devices. The software further controls the associations needed between the commands requested by the consumer (e.g., by pressing buttons or other areas of the display 85) and the actual IR commands corresponding to those requests. For example, slider 115 may send IR commands to the amplifier of one device when the displayed screen is the "pictures" screen 20, but it may send IR commands to the amplifier of another device when the displayed screen is the "music" screen 25. The underlying associations are all controlled by the software (and/or hardware), such that the consumer is free to exercise title-based direct access control.

The prior description dealt mainly with the methods of using the remote control 10, as well as some of the software aspects of the remote control. The following description will focus on the hardware aspects of the present invention, some of which may have already been briefly described.

Figure 18:
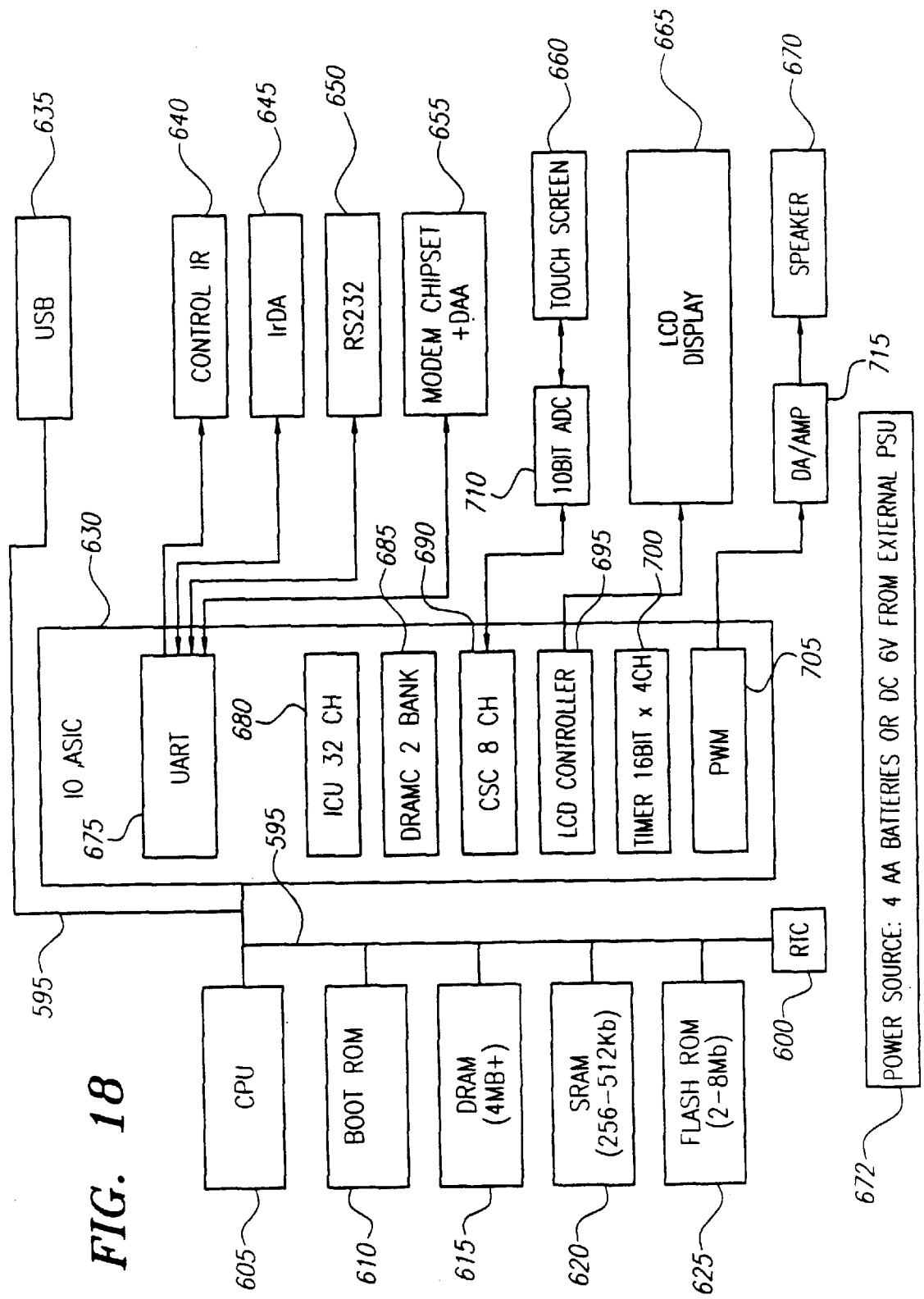
FIG. 18 is a high-level schematic of hardware used in a preferred embodiment of the remote control of the present invention.

FIG. 18 is a high-level schematic of hardware used in a preferred embodiment of the remote control 10 of the present invention. The hardware is in the same class and similar to that of known personal data organizers such as the Palm Pilot by US Robotics. A data bus 595 connects an RTC (real-time clock) 600, CPU (Central Processing Unit) 605, memory chips 610, 615, 620, and 625, Input/Output Application Specific Integrated Circuit (IO-ASIC) 630, and USB (Universal Serial Bus) port 635. Various other communications ports 640, 645, 650, and 655, are connected to the IO-ASIC 630 as will be described shortly. The remote control has a touch screen 660 and LCD 665 as previously described, and may also have a speaker 670 for sound. The power source 672 is shown preferably as four AA batteries or a 6V DC from an external PSU (power source unit).

The CPU 605 is preferably the Mitsubishi M32000D4AFP, but that is not required. The RTC 600 is preferably a crystal-based clock, and is used to synchronize IR commands with the proper TV broadcast, radio broadcast, satellite broadcast, or other signals to satisfy the consumer's requests. In addition, the RTC 600 is used to determine when a particular title or titles from a CD have completed based on the play-time associated with the title or titles.

Memory 610 is a boot ROM for holding the system software, which includes the system control component and may include some or all of the application interface component, though the application interface component is preferably stored in the flash ROM 625. Flash ROM 625 also stores downloaded information such as TV schedules, CD track data, etc. The flash ROM 625 is preferably at least 2–8 Megabytes. Pre-loaded IR command libraries are preferably stored in the flash ROM 625. Memory chips 615 and 625 are RAM chips used for working memory. Memory 615 is shown as a DRAM, and is preferably at least 4 megabytes. Memory 620 is shown as an SRAM and is preferably at least 256–512 Kilobytes. The SRAM 620 is optional, but if it is present it may be used for certain operations that may require faster speed than other operations.

The IO-ASIC 630 is preferably a Mitsubishi M65455FP, but that is not required. It comprises a UART (Universal Asynchronous Transmitter and Receiver) 675, a 32-channel ICU (Interrupt Controller Unit) 680, a 2-bank DRAMC (DRAM controller) 685, an 8-channel CSC (Chip Select Controller) 690, an LCD controller 695, its own 16-bit 4-channel timer 700, and a PWM (Pulse Width Modulator) 705. The UART 675 is used to transmit data through port 640 which is a control IR port, and to transmit and receive data through ports 645, 650, and 655. Control IR port 640 or its equivalent is essential because the data sent through control IR port 640 are the IR commands to control devices. The other ports (635, 645, 650, and 655) are optional, but at least one is required in order for the remote control 10 to connect to an outside data source such as the internet. Port 645 is an IrDA (Infrared Data Association) port used for wireless communication. (There may also be additional hardware for RF (radio frequency) communications, though such hardware is not shown.) Port 650 is an RS232 port for connection to a standard serial port of a PC. Port 655 is a modem port for connection directly to telephone lines. Port 635 is a USB port which is an industry standard port for "plug and play" connection to PCs. The USB port 635 is connected directly to bus 595 and can transfer data at a rate of up to 4 megabytes per second, much faster than the UART 675 which can typically transfer data at a rate of only up to about 115 kilobytes per second. The ports other than the USB port 635 are connected to bus 595 only through the UART 675 in the IO-ASIC 630.

The ICU 680 coordinates and controls requests to the CPU 605 from various input and output devices either integrated with the remote control 10 or connected thereto. The DRAMC 685 controls access to the DRAM 615, and the CSC 690 processes the consumer's touch screen 660 requests, which first pass through a 10-bit analog-to-digital converter 710. The CSC 690 also interacts with the flash ROM 625, the modem port 655, and other components, and serves a fairly general control function in the IO subsystem. The LCD controller 695 controls what is displayed on the LCD display 665 (in FIG. 18 LCD 665 represents the display 85 seen in the other drawings). The timer 700 is used for short timing (on the order of milliseconds) within the IO-ASIC 630 (such as repeated checking of interface status, refreshing the LCD display 665, etc.). The PWM 705 sends digital signals to a digital to analog amplifier 715 which passes the signal to speaker 670. The speaker 670 may be used to alert the consumer of errors on input when programming, or attempted unauthorized access to certain data, or a pending request, or any other event through the use of various beeping or buzzing sounds of various frequencies, volumes, and/or durations. Or the speaker 670 may be used for voice sound that states title-based descriptions so that seeing-impaired persons may benefit from the present invention. The voice sounds may be loaded from an outside data source, such as the internet, or there may be suitable text-to-voice software for creating the voice data from the title-based descriptions.

Thus, the remote control 10 has hardware for generating IR commands suitable for controlling consumer devices, and may also have hardware for receiving IR communications (e.g., through IrDA port 645). It may have hardware for higher-bandwidth wireless data communications such as fast IrDA, and may also have physical connections for wired data communications, such as a modem (port 655) for direct phone connection, or wired connections (port 635 or 650) to a PC. There are large amounts of non-volatile memory (flash ROM 625, preferably at least 1 megabyte, and more preferably at least 2 megabytes) for the storage of data relevant to the operation of the consumer devices to be controlled, and large amounts of working memory (DRAM 615 and SRAM 620) as well. The remote control 10 will be powered preferably by batteries (672), though it is possible to provide another DC power source or even an AC power source. The batteries may be rechargeable, and may be associated with a table-top docking station 1 which provides power for recharging or table-top use, and which may also provide the various connections needed for communications as described herein (e.g., modem for direct internet connection and intelligent telephony control, connections with a home PC, etc.). The docking station may also include a connected device 2, such as a CD drive for reading CD track data, and/or a printer for printing information from the remote control's memory such as user configuration files, information related to past programs viewed by particular users, help information, or any other information.

As described herein, the remote control 10 may connect to the internet or other data source directly or by a home PC. The connection may be through wired communications or by wireless. Wired connections may be made through a USB connection or other serial connection to a PC or other hardware device, or through a standard connection to telephone lines. Wireless communications may be through the use of IrDA protocols or other wireless links (e.g., RF with the use of additional hardware) to a PC or the phone lines.

In the case of a direct link, the remote control 10 will either have a standard telephone connection point with an internal modem, or else hardware and software enabling wireless communication with a standard domestic wireless phone base, such that a telephone connection could be made between the remote control 10 and the internet. The source connected to may be a standard ISP company, in which case the remote control would contain all of the necessary internet protocols and web client technology to be able to send "http" requests and receive-data or download program "applets" in response. The source connected to may instead be dedicated solely to serving remote controls 10 of the present invention. In that case, the consumer would not have to have access to a pre-existing ISP account, as the necessary data for initial setup and configuration of the remote control 10 for a particular set of devices could be performed simply by a phone connection, with companion server software and server hardware at a remote location providing all the necessary access to third party internet locations.

With connection via a home PC, companion PC software could use a pre-existing service with an ISP to download all relevant data, for subsequent transfer to the remote control 10. If the consumer does not have an ISP account, but the PC is equipped with a modem, the same companion remote server may be used as for the case described where there is a direct telephone connection from the remote control 10. When used in conjunction with a PC, the remote control 10 would not require all of the communications hardware and software herein described, and hence an embodiment without all or part of the communications hardware and/or software may provide an attractive lower-cost alternative for consumers who already own a PC. For those without a PC, the embodiment of the remote control 10 with internet connection hardware and software built in might be more expensive than the embodiment without it, but still it would likely be much less expensive than purchasing a PC and would avoid the complexities associated with PCs which may not be necessary for operation of the remote control 10.

As noted herein, the remote control 10 may have an integrated software keyboard or other input means, but it might be desirable for certain programming tasks to be performed using companion software with an IR keyboard in conjunction with the remote control's display or another display, or using PC software on a PC. That is because the typical PC display would provide a larger viewing area than that on the remote control 10 itself, and the keyboard and mouse may facilitate input of data for many consumers that are used to such input means. Even without a companion PC and companion software, programming of the remote control 10 may be simplified through the use of an IR keyboard.

The remote control 10 may also have an integrated CD drive, but if it does not, a separate CD drive would be needed for cataloguing the consumer's CD collection. That is because to free the consumer from having to enter in the details of every CD in a collection, the track data from the CD must be read from a software-controllable CD drive so that the data can be associated with the corresponding internet CDDB data. As previously stated, even if the CD drive is not integrated with the remote control 10, the CD drive may nonetheless be accessible by the remote control 10.

To catalog a CD for future control by the remote control 10, the consumer would place the CD in a CD drive. Software would then determine the track numbers and lengths, and correlate the information with the data from the CDDB or other data source. The consumer would place the CD in the CD player in the slot where the software expects the CD to be, and the CD data would be transferred to the remote control 10 using wired or wireless communications as described herein. The remote control 10 would then be prepared to display song titles, album titles, artists, track data, etc., and allow the same to be listed, browsed and/or selected for play.

While certain embodiments are illustrated in the drawings and have just been described herein, it will be apparent to those skilled in the art that many modifications can be made to the embodiments without departing from the inventive concepts described. Accordingly, the invention is not to be restricted except by the claims which follow.

What is claimed is:

1. A method of controlling a device that responds to a set of infrared (IR) commands comprising the steps of:
   providing a remote control capable of sending IR commands, the remote control having a memory, a touch screen, and a graphical display;
   accessing title-based descriptions stored in the memory of the remote control, sorting the title based descriptions, and displaying the title based descriptions on the display, said title-based descriptions comprising a first title-based description; and
   identifying an IR command sequence to be sent to the device from the remote control to cause the device to play a program associated with the first title-based description, said identification occurring in response to activation of an area on the touch screen corresponding to the first title-based description.

2. The method of claim 1 wherein the title-based descriptions are loaded into the memory of the remote control from the internet.

3. The method of claim 1 further comprising the step of loading the title-based descriptions into the memory of the remote control from a memory of a PC.

4. The method of claim 1 wherein the title-based descriptions comprise broadcast TV program names and corresponding broadcast times.

5. The method of claim 1 wherein the title-based descriptions comprise the title of a music CD album, the title of each song on the CD album, and the corresponding duration of each song title.

6. The method of claim 1 wherein the remote control further comprises an IrDA port for wireless access to an outside data source.

7. The method of claim 1 wherein the remote control further comprises an RS232 port for wired access to an outside data source.

8. The method of claim 1 wherein the remote control further comprises a modem port for wired access to an outside data source.

9. The method of claim 1 wherein the remote control further comprises a USB port for wired access to an outside data source.

10. The method of claim 1 wherein the remote control further comprises at least two actuating buttons.

11. The method of claim 10 wherein at least one of the at least two buttons is a graphical button that appears on the graphical display.

12. The method of claim 10 wherein identification of functions associated with the at least two actuating buttons are displayed on the graphical display.

13. The method of claim 1 further comprising the step of sending the identified IR command sequence from the device to the remote control in response to a signal from a real time clock within the remote control.

14. The method of claim 1 further comprising the step of loading the predetermined set of IR commands into the memory of the remote control.

15. The method of claim 1, wherein the remote control is programmable, and further comprising the steps of programming the remote control to:

determine an identity of a first user based upon first information entered into the memory of the remote control;

present second information on the graphical display in response to the first information;

activate the remote control for use in controlling the device, in response to selection of the second information, said use being associated with the first user; and present on the graphical display a subset of the title-based descriptions, said subset being dependent upon the first information.

16. A method of using a remote control having a memory, hardware for sending infrared (IR) commands, a touch screen, and an integrated graphical display, to select a program to be played, and to have the program played on a device that responds to IR commands, comprising the steps of:

accessing title-based descriptions stored in the memory of the remote control, said title-based descriptions comprising a first title-based description associated with a first program;

sorting the title-based descriptions;

browsing the title-based descriptions on the graphical display;

activating an area on the touch screen corresponding to the first title-based description, said area being associated with a first IR command sequence stored in the memory of the remote control sufficient to effect play of the first program when sent to the device; and sending the first IR command sequence to the device.

17. The method of claim 16 further comprising the step of programming the remote control to define screen layouts used to present the title-based descriptions on the graphical display.

18. The method of claim 16 wherein the first IR command sequence is sent in response to a signal from a real time clock within the remote control.

19. The method of claim 16 further comprising the step of programming the remote control to allow selection of tasks required to select the first program.

20. The method of claim 19 further comprising the steps of displaying help information associated with a first screen in response to activation and deactivation of a help button associated with the remote control, said activation and deactivation occurring while the first screen is being displayed on the graphical display.

21. A method of using a remote control having a memory, hardware for sending infrared (IR) commands, and an integrated graphical display, to select a program to be played, and to have the program played on a device that responds to commands from a base station, comprising the steps of:

accessing title-based descriptions stored in the memory of the remote control, said title-based descriptions comprising a first title-based description associated with a first program;

sorting the title-based descriptions;

displaying the title-based descriptions on the graphical display;

identifying an IR command sequence to send to the base station to cause the base station to send a proper command sequence to the device to effect play of the first program, said identification occurring in response to selection of the first title-based description from the displayed title-based descriptions.

22. The method of claim 21 wherein the first title-based description is selected by activating an area on a touch screen overlaying the graphical display, said area corresponding to the first program and having associated therewith the identified IR command sequence.

23. The method of claim 22 further comprising the step of sending the identified IR command sequence to the base station in response to activating the area.

24. The method of claim 23 further comprising the step of sending the proper command sequence from the base station to the device.

25. A system for controlling a plurality of consumer devices that respond to infrared (IR) commands, the system comprising a programmable remote control comprising:

hardware inside said remote control capable of sending IR commands;

an integrated graphical display on said remote control capable of displaying sorted title-based descriptions;

a touch screen overlaying the integrated graphical display;

integrated software programmed to present a set of screens on the graphical display for navigating through available program options;

at least one port on said remote control for communicating with an external data source;

a memory in said remote control; and at least two physical actuating buttons on said remote control one of said actuating buttons capable of selection one or more of said sorted title-based descriptions.

26. The system of claim 25 wherein the at least one port is an IrDA port for wireless access to the external data source.

27. The system of claim 25 wherein the at least one port is an RS232 port for wired access to the external data source.

28. The system of claim 25 wherein the at least one port is a modem port for wired access to the external data source.

29. The system of claim 25 wherein the at least one port is a USB port for wired access to the external data source.

30. The system of claim 25 further comprising a CD drive.

31. The system of claim 25 wherein functions associated with the at least two physical actuating buttons are displayed on the graphical display.

32. The remote control of claim 25 further comprising a help button which activates help information associated with a first screen when the help button is activated and then deactivated while the first screen is displayed on the graphical display, and wherein the help button activates help information associated with a second button when the second button is selected while the help button is activated.

33. The system of claim 25, wherein the remote control is battery-powered and wherein the memory stores IR commands for controlling the consumer devices, the system further comprising a docking station having a battery charger for recharging batteries used to supply power to the remote control.

34. The system of claim 33 wherein the docking station further comprises a CD drive.

35. The system of claim 33 wherein the docking station further comprises a printer.

36. The system of claim 25 wherein the integrated software is further programmed to load title-based descriptions into the memory of the remote control from the external data source, said title-based descriptions corresponding to programs.

37. The system of claim 36 wherein the title-based descriptions comprise a first title associated with a first program, and wherein the integrated software is programmed to associate a first IR command sequence with the first title-based description, said first IR command sequence effecting play of the first program when executed.

38. The system of claim 33 wherein the docking station further comprises a port for communicating with an external data source.

39. The system of claim 38 wherein the docking station further comprises a CD drive.

40. A method of using a remote control having a memory, hardware for sending infrared (IR) commands, a touch screen, and an integrated graphical display, to select a program to be played, and to have the program played on a device that responds to IR commands, comprising the steps of:
   accessing title-based descriptions from the memory of the remote control, said title-based descriptions comprising a first title-based description associated with a first program;
   browsing the title-based descriptions on the graphical display;
   activating an area on the touch screen corresponding to the first title-based description, said area being associated with a first IR command sequence stored in the memory of the remote control sufficient to effect play of the first program when sent to the device;
   sending the first IR command sequence to the device; and
   programming the remote control to define screen layouts used to present the title-based descriptions on the graphical display.

41. The method of claim 40, wherein the remote control is programmable, and further comprising the steps of programming the remote control to:
   determine an identity of a first user based upon first information entered into the memory of the remote control;
   present second information on the graphical display in response to the first information;
   activate the remote control for use in controlling the device, in response to selection of the second information, said use being associated with the first user; and
   present on the graphical display a subset of the title-based descriptions, said subset being dependent upon the first information.

42. A method of using a remote control having a memory, hardware for sending infrared (IR) commands, a touch screen, and an integrated graphical display, to select a program to be played, and to have the program played on a device that responds to IR commands, comprising the steps of:
   accessing title-based descriptions from the memory of the remote control, said title-based descriptions comprising a first title-based description associated with a first program;
   browsing the title-based descriptions on the graphical display;
   activating an area on the touch screen corresponding to the first title-based description, said area being associated with a first IR command sequence stored in the memory of the remote control sufficient to effect play of the first program when sent to the device;
   sending the first IR command sequence to the device; and
   programming the remote control to allow selection of tasks required to select the first program.

43. A system for controlling a plurality of consumer devices that respond to infrared (IR) commands, the system comprising a programmable remote control comprising:
   hardware capable of sending IR commands;
   an integrated graphical display;
   a touch screen overlaying the integrated graphical display;
   integrated software programmed to present a set of screens on the graphical display for navigating through available program options;
   at least one port for communicating with an external data source;
   a memory;
   a docking station having at least a battery charger for recharging batteries used to supply power to the remote control and a CD drive; and
   at least two physical actuating buttons,
   wherein the remote control is battery-powered and wherein the memory stores IR commands for controlling the consumer devices.

44. A system for controlling a plurality of consumer devices that respond to infrared (IR) commands, the system comprising a programmable remote control comprising:
   hardware capable of sending IR commands;
   an integrated graphical display;
   a touch screen overlaying the integrated graphical display;
   integrated software programmed to present a set of screens on the graphical display for navigating through available program options;
   at least one port for communicating with an external data source;
   a memory;
   a docking station having at least a battery charger for recharging batteries used to supply power to the remote control and a printer; and
   at least two physical actuating buttons,
   wherein the remote control is battery-powered and wherein the memory stores IR commands for controlling the consumer devices.

45. A system for controlling a plurality of consumer devices that respond to infrared (IR) commands, the system comprising a programmable remote control comprising:
   hardware capable of sending IR commands;
   an integrated graphical display;
   a touch screen overlaying the integrated graphical display;
   integrated software programmed to present a set of screens on the graphical display for navigating through available program options;
   a memory;
   a docking station having a battery charger for recharging batteries used to supply power to the remote control and at least one port for communicating with an external data source;
   an optical disc drive; and
   at least two physical actuating buttons,
   wherein the remote control is battery-powered and wherein the memory stores IR commands for controlling the consumer devices.

46. The system of claim 45 wherein the docking station further comprises a CD drive.

* * * * *